United States Patent
Hastings et al.

(10) Patent No.: US 7,546,252 B2
(45) Date of Patent: Jun. 9, 2009

(54) APPROACH FOR MANAGING RENTAL ITEMS ACROSS A PLURALITY OF DISTRIBUTION LOCATIONS

(75) Inventors: W. Reed Hastings, Santa Cruz, CA (US); Tom Dillon, Scotts Valley, CA (US); Neil Duncan Hunt, Mountain View, CA (US)

(73) Assignee: Netflix, Inc., Los Gatos, CA (US)

( * ) Notice: Subject to any disclaimer, the term of this patent is extended or adjusted under 35 U.S.C. 154(b) by 848 days.

(21) Appl. No.: 10/746,605

(22) Filed: Dec. 23, 2003

(65) Prior Publication Data
US 2005/0086127 A1  Apr. 21, 2005

(51) Int. Cl.
G06F 15/16 (2006.01)
G06F 17/60 (2006.01)
G04N 7/173 (2006.01)

(52) U.S. Cl. .......................... 705/26; 381/77; 709/206; 725/60; 725/104

(58) Field of Classification Search ...................... 705/1, 705/7–10, 26, 28; 235/383, 385; 381/77, 381/81, 86–7; 709/206, 212, 219, 222; 725/60, 725/104
See application file for complete search history.

(56) References Cited

U.S. PATENT DOCUMENTS 4,839,505 A * 6/1989 Bradt et al. ................. 235/381

(Continued)

FOREIGN PATENT DOCUMENTS

JP  08057043  2/1996

(Continued)

OTHER PUBLICATIONS

Kenton County Public Library, The talking Book Library of Northern KY, Kenton County Public Library information page. Retrieved from the internet at <http://www.kenton.lib.ky.us/information/talking.html>, Retrieval date unknown, 2 pages.

(Continued)

Primary Examiner—Andrew Joseph Rudy
(74) Attorney, Agent, or Firm—Hickman Palermo Truong & Becker LLP

(57) ABSTRACT

An "inventory free" approach for managing rental items across a plurality of distribution locations includes sending at least some rental items that are not needed by two or more distribution locations to a designated distribution location. Rental items sent to the designated distribution location may be permanently stored at the designated distribution location, returned to the distribution location from which they were sent, or sent to other distribution locations, depending upon where the rental items are needed. In situations where particular rental items are not currently needed by customers at a distribution location, but there is a high likelihood that the particular rental items will be needed by the customers within a specified time, the particular rental items may be maintained at the distribution location as "float" and not sent to the designated distribution location. The float is re-processed as returned rental items prior to being again rented to customers. The determination of whether customers need, or do not need, a particular rental item may be made based upon a wide variety of criteria such as time criteria, actual and predicted customer demand for rental items, actual and predicted returns of rental items, Net Ships and predicted loss and breakage of rental items.

87 Claims, 9 Drawing Sheets

U.S. PATENT DOCUMENTS

| | | | |
|---|---|---|---|
| 5,095,195 | A | 3/1992 | Harman et al. |
| 5,664,110 | A | 9/1997 | Green et al. |
| 5,704,017 | A | 12/1997 | Heckerman et al. |
| 5,752,160 | A | 5/1998 | Dunn |
| 5,790,426 | A | 8/1998 | Robinson |
| 5,812,641 | A * | 9/1998 | Kanoh et al. ............ 379/91.02 |
| 5,842,199 | A | 11/1998 | Miller et al. |
| 5,861,906 | A | 1/1999 | Dunn et al. |
| 5,884,282 | A | 3/1999 | Robinson |
| 5,909,638 | A * | 6/1999 | Allen ....................... 725/146 |
| 5,918,014 | A | 6/1999 | Robinson |
| 5,918,213 | A | 6/1999 | Bernard et al. |
| 5,945,987 | A | 8/1999 | Dunn |
| 5,959,945 | A | 9/1999 | Kleiman |
| 6,012,052 | A | 1/2000 | Altschuler et al. |
| 6,016,475 | A | 1/2000 | Miller et al. |
| 6,029,161 | A | 2/2000 | Lang et al. |
| 6,041,311 | A | 3/2000 | Chislenko et al. |
| 6,049,777 | A | 4/2000 | Sheena et al. |
| 6,092,049 | A | 7/2000 | Chislenko et al. |
| 6,108,493 | A | 8/2000 | Miller et al. |
| 6,112,186 | A | 8/2000 | Bergh et al. |
| 6,236,985 | B1 | 5/2001 | Aggarwal et al. |
| 6,286,139 | B1 | 9/2001 | Decinque |
| 6,289,389 | B1 | 9/2001 | Kikinis |
| 6,308,168 | B1 | 10/2001 | Dovich et al. |
| 6,321,179 | B1 | 11/2001 | Glance et al. |
| 6,321,221 | B1 | 11/2001 | Bieganski |
| 6,330,592 | B1 | 12/2001 | Makuch et al. |
| 6,334,127 | B1 | 12/2001 | Bieganski et al. |
| 6,389,372 | B1 | 5/2002 | Glance et al. |
| 6,412,012 | B1 | 6/2002 | Bieganski et al. |
| 6,484,123 | B2 | 11/2002 | Srivastava |
| 6,487,539 | B1 | 11/2002 | Aggarwal et al. |
| 6,487,541 | B1 | 11/2002 | Aggarwal et al. |
| 6,496,816 | B1 | 12/2002 | Thiesson et al. |
| 6,799,165 | B1 * | 9/2004 | Boesjes ....................... 705/28 |
| 6,996,606 | B2 * | 2/2006 | Hasegawa ................... 709/206 |
| 7,012,520 | B2 * | 3/2006 | Webb, Sr. .............. 340/539.13 |
| 7,046,138 | B2 * | 5/2006 | Webb, Sr. .............. 340/539.13 |
| 7,054,834 | B2 * | 5/2006 | Hatakeyama ................ 705/26 |
| 7,055,741 | B2 * | 6/2006 | Bong et al. .............. 235/382.5 |
| 7,058,581 | B1 * | 6/2006 | Young ............................ 705/1 |
| 7,174,568 | B2 * | 2/2007 | Chatani et al. ................. 726/27 |
| 7,181,758 | B1 * | 2/2007 | Chan .......................... 725/110 |
| 2004/0153413 | A1 | 8/2004 | Gross |
| 2004/0158503 | A1 | 8/2004 | Gross |
| 2004/0158504 | A1 | 8/2004 | Gross |
| 2004/0162783 | A1 | 8/2004 | Gross |
| 2004/0172274 | A1 | 9/2004 | Gross |
| 2004/0172275 | A1 | 9/2004 | Gross |
| 2004/0172342 | A1 | 9/2004 | Gross |
| 2004/0243479 | A1 | 12/2004 | Gross |
| 2004/0243480 | A1 | 12/2004 | Gross |
| 2004/0267669 | A1 | 12/2004 | Gross |
| 2005/0125307 | A1 | 6/2005 | Hunt et al. |
| 2006/0149685 | A1 | 7/2006 | Gross |

FOREIGN PATENT DOCUMENTS

| | | |
|---|---|---|
| JP | 2001243285 A | 9/2001 |
| WO | WO 91/05307 A1 | 4/1991 |

OTHER PUBLICATIONS

Proquest, "NetFlix launches DVd subscriptions club; Blockbuster set to stock up on format," Billboard, New York, Oct. 16, 1999, vol. 111, Iss. 42, p. 77, 1 page.

Proquest, "NetFlix.com Transforms DVD Business Eliminating Late Fees and Due Dates From Movie Rentals; NetFlix.com's New Marquee Program Creates Near 'DVD-on-Demand'," Business Wire, New York, Sep. 28, 1999, 1 page.

"Facts About the Library," a section of book entitled "Oh! Say. Can You See . . . " 1992 American Action Fund for Blind Children and Adults, retrieved from http://web.archive.org/web/20000104114940/www.actionfund.org/saysee09.htm, 2 pages.

Application for Library Services for the Kenneth Jernigan Library for Blind-Children, last updated May 27, 1999, retrieved from http://web.archive.org/web/19991103190509/www.actionfund.org/kjlib.htm, 3 pages.

Audio Diversions Home Page, last updated Mar. 8, 1999 [online] retrieved on Feb. 26. 2004 from http://web.archive.org/web/19990508140319/www.audiodiversions.com/audiodiversions-cgi/home.cgi; 2 pages.

Literature for Listening Club of Audio Diversions, last updated Mar. 12, 1999 [online] retrieved on Aug. 31, 2003 from http://web.archive.org/web/19990908120905/www.audiodiversions.com/audiodiversions-cgi/listening.cgi?id=0508075008; 2 pages.

Audiobook Search of Audio Diversions [online] retrieved on Aug. 31, 2003 from http://web.archive.org/web/19990908104726/www.audiodiversions.com/audiodiversions-cgi/catalog.cgi?id=0508075008, 2 pages.

Books On Tape Home page, Apr. 22, 1999 [online] retrieved on Aug. 31, 2003 from http://web.archive.org/web/19990424061355/http://www.booksontape.com/, 2 pages.

More About B-O-T® & Frequently Asked Questions, [online] retrieved on Aug. 31, 2003 from http://web.archive.org/web/19990508223402/http://www.booksontape.com/i/help/htm, 11 pages.

America's Online Door to Door Rental Store, 1999 copyright [online] retrieved from http://web.archive.org/web/19990922160527/http://www.dvdovernight.com/; 2 pages.

Getting Started, 1999 copyright [online] retrieved from http://web.archive.org/web/20000304111243/www.dvdovernight.com/started.html; 7 pages.

Top DVD Rentals, DVD Overnight Store Policies & Frequently Asked Questions, 1999 copyright [online] retrieved from http://web.archive.org/web/19991123014901/www.dvdovernight.com/service.html; 8 pages.

Customer Service Questions & Answers, 2000 copyright [online] retrieved from http://web.archive.org/web/20001109071400/www.dvdovernight.com/dvd/custservice.html; 5 pages.

DVD Cache Frequently Asked Questions, [online] retrieved from http://web.archive.org/web/20000512001209/www.dvdcache.com/store/customer_service.html; 5 pages.

Libraries [online] retrieved on Feb. 26, 2004 from http://www.archives.mcgill.ca/resources/guide/vol1/rg40.htm; 8 pages.

Fastlane Video & Records—Rental Prices [online] retrieved from http://web.archive.org/web/19990506190744/members.aol.com/atfastlane/video/rental.htm; 1 page.

5 Day Rental [online] retrieved from http://web.archive.org/web/19990210101315/members.aol.com/atfastlane/video/index.htm; 13 pages.

Fastlane Video & Records [online] retrieved from http://web.archive.org/web/19990209181937/members.aol.com/atfastlane/; 2 pages.

Fastlane Video & Records—Payment on Account [online] retrieved from http://web/archive.org/web/19990504102814/members.aol.com/atfastlane/video/payment.htm; 1 page.

"Try Before You Buy Program" [online] retrieved from http://web.archive.org/web/19990922040420/www.gametradersclub.com/gametradersclub/tryb.html; 2 pages.

Trade or Sell Your Games! [online] retrieved from http://web.archive.org/web/19991010012624/www.gametradersclub.com/gametradersclub/tradorselyou.html; 2 pages.

"Try Before You Buy Program" [online] retrieved from http://web.archive.org/web/19991012021059/gametradersclub.com/gametradersclub/tryb.html; 2 pages.

Print Culture and English Speaking Quebec [online] retrieved on Feb. 26, 2004 from http://www.hbic.library.utoronto.ca/fconfmcnally_fr.htm; 5 pages.

Welcome to Home Film [online] retrieved from http://web.archive.org/web/19961106000542/http://www.homefilmfestival.com/index.html; 3 pages.

Membership [online] retrieved from http://web.archive.org/web/19961106001054/www.homefilmfestival.com/membership.html; 2 pages.

It's Easy! Ordering info [online] retrieved from http://web.archive.org/web/19961106001006/www.homefilmfestival.com/infopack.html; 2 pages.

Online Video Rentals Multiple Rental Order Form [online] retrieved on Jul. 2, 2003 from http://web.archive.org/web/19990420045928/www.homefilmfestival.com/lrgordr.html; 3 pages.

Online Video Rentals Individual Rental Order [online] retrieved on Jul. 2, 2003 from http://web.archive.org/web/19990127160422/www.homefilmfestival.com/indordr.html; 3 pages.

Magic Disc Entertainment [online] retrieved on Feb. 27, 2004 from http://web.archive.org/web/19981206142316/http://www.magicdisc.com/; 2 pages.

Rental Program [online] retrieved from http://web.archive.org/web/19990503073644/www.magicdisc.com/rentals/rentalprogram.htm; 3 pages.

Featured DVDs for Saturday, Jan. 16, 1999, 1997-1999 copyright [online] retrieved on Jul. 3, 2003 from http://web.archive.org/web/19990117011532/http://www.netflix.com/; 5 pages.

DVD Favorites, 1997-1999 copyright [online] retrieved on Jul. 3, 2003 from http://web.archive.org/web/19991204131346/www.netflix.com/sf/favorites.asp?sid=14; 4 pages.

Future Reflections, Barbara Cheadle, vol. 12, No. 1 Winter, 1993 [online] retrieved on Aug. 23, 2003 from http://www.nfb.org/fr/fr1/93win.htm; pp. 1-2; 70-72.

Hear Ye! Hear Ye! National Federation of the Blind archived in Feb. 1999 retrieved from http://web.archive.org/web/19991112190729/www.nfb.org/fr98ws20.htm, 7 pages.

E-mail posting: Newsgroups: alt.games.video.sony-playstation from:David Esposito (cooldej@home.com) with subject: Need Cheep Games; Date: Feb. 7, 1999; 1 page.

E-mail posting: Newsgroups: alt.games.video.sony-playstation from: ramon (ramon@theriver.com) with subject: Need Cheep Games; Date: Feb. 8, 1999; 1 page (same page as Esposito posting).

E-mail posting: Newsgroups: alt.games.video.sony-playstation from: ramon (ramon@theriver.com) with subject: 100'S of Games for About a Buck a Day . . . (Incredible Deal); Date: Feb. 6, 1999; 1 page.

E-mail posting: Newsgroups: alt.games.video.sony-playstation from: ramon (ramon@theriver.com) with subject: Best Deal Around 100's of games for about a buck a day: Date: Feb. 8, 1999, 1 page.

E-mail posting: Newsgroups: alt.games.video.sony-playstation from: ramon (ramon@theriver.com) with subject: Best Deal I've Ever Seen . . . 100's of games for about a buck a day; Date: Feb. 8, 1999, 1 page.

E-mail posting: Newsgroups: alt.games.video.sony-playstation from: ramon (ramon@theriver.com) with subject: Best Deal Ever!! Choose from 100's of games for about a buck a day . . . Plus a Free Playstation; Date: Feb. 9, 1999; 1 page.

E-mail postings of 6 messages in a thread from the following message: Newsgroups: alt.games.video.sony-playstation from: ramon (ramon@theriver.com) with subject: Best Deal Ever . . . All the N-64 Games You Want for About a Buck a Day; Date: Feb. 10, 1999; 3 pages.

E-mail posting: Newsgroups: alt.games.video.sony-playstation from: ramon (ramon@theriver.com) with subject: All the New Playstation Games are Yours for About a Buck a Day; Date: Feb. 10, 1999; 1 page.

E-mail posting: Newsgroups: alt.games.video.sony-playstation from: ramon (ramon@the river.com) with subject: Check Out the New Web Site (Best Deal I've Seen); Date: Jul. 11, 1999; 1 page.

E-mail posting: Newsgroups: alt.games.video.sony-playstation from: ramon (ramon@theriver.com) with subject: How Many Games Can You Beat In A Month?; Date: Jul. 11, 1999; 1 page.

"A New Way to Avoid Exercise", Newsweek Mar. 15, 1999; 1 page.

Additional Information from Sally Fry, Community Relations Coordinator Unabashed Librarian, No. 82, p. 3 1991.

Mailbox Access to Your Library (MAYL), Florida Libraries, Unabashed Librarian, No. 82, p. 3 1991.

Glenn Miller, Letter from Glen Miller, Director of Orange County Library System, Unabashed Librarian, No. 82, p. 3 1991.

Brass, Kevin, "Company Town; Rental Control; Video Distributor Takes Industry Down Controversial Path", Los Angeles Times, Nov. 28, 1997; 4 pages.

Mary L. Daniels, A Love for Libraries; Whether Large or Small, They are Special Places, Editorial; p. A19, Orlando Sentinel, Nov. 11, 1994; 2 pages; 2 pages.

DeJong Jenifer, "Securing Your Site for the Age of E-Commerce", VAR Business Strategy Guide Supplement Nov. 16, 1998; 3 pages.

"Door-to-Door Service", High Points, Feb. 1999; vol. 6, No. 2, p. 50, 2 pages.

Greenemeier, Larry, "Manna Rises Above Conventional"; Net Marketing; Manna Network Technologies Midrange Systems; Dec. 18, 1998; No. 18, vol. 11; p. 41; 2 pages.

Hilda M. Hamlyn, "Eighteenth-century circulating libraries in England," The Library, pp. 197-222, Dec. 1946.

Horowitz, Alan, S., "PC Leasing Gains Ground—Shorter life spans popularize practice", Information Week, May 25, 1998, 3 pages.

Ingram, Bob, "Boston Bears Watching" Supermarket Business Mar. 1, 1999; 5 pages.

Kim, Nancy J., "Nordstrom seen Net gains with Streamline", Puget Sound Business Journal Oct. 30, 1998; 2 pages.

Alan Donald McKillop, "English circulating libraries, 1725-50" The Library, pp. 477-485, Mar. 1934.

Memmott, Carol, "Web Site Streamlines Your Errands", USA Today Nov. 16, 1998; 2 pages.

"News Briefs", Video Store Mar. 21, 1999; 1 page.

"Nordstrom Announces Partnership With Streamline", PR NewsWire Oct. 8, 1998; 2 pages.

Said, Carolyn, "Chips and Flicks On Your Doorstep", Business, p. B1, The San Francisco Chronicle, Oct. 18, 1999, 4 pages.

Shrieves, Linda, "Now Library Books Just Show Up at Your Door", Orlando Sentinel, Dec. 7, 1990; 2 pages.

"Streamline" DSN SuperCenter ClubBusiness Mar. 29, 1999; 1 page.

Hal R. Varian, "Buying, renting, and sharing information goods," Technical report, School of Information Management and Systems, UC Berkeley, Dec. 1994; 20 pages.

Hal R. Varian, "Circulating Libraries and Video Rental Stores," Dec. 1996, retrieved from http://web.archive.org; pp. 1-14.

Hal R. Varian, et al., "Circulating Libraries and Video Rental Stores," University of Michigan, Dearborn, University of California, Berkeley, http://www.sims.berkeley.edu/~hal/Papers/history/history.html, Mar. 2000; pp. 1-13.

Griest, Guinevere L.: Mudie's Circulating Library and the Victorian Novel. Bloomington and London, Indiana, Univ. Press, 1970, 282 pages.

Books by Mail, a handbook for libraries (1977) by Choong H. Kim. In the Quebec section at p. 394, the McLennan Traveling Libraries of McGill University were reviewed, 2 pages.

James Lardner, Fast Forward: Hollywood, the Japanese and the Onslaught of the VCR by, Chapter 12 Wilbur & Orville & Tom, Dick, & Harry and Chapter 13 The Rental Wars, pp. 168-202 (1987).

Abigail A. Loomis, "Subscription libraries," in Wayne A. Wiegand and Jr. Donald G. Davis, editors, Encyclopedia of Library History, pp. 608-610. Garland Publishing, Inc., New York & London, 1994.

Glenn Miller Customer Service & Innovation in Libraries pp. 73-90, Highsmith Press 1996. ("Book").

Brad Dick, Editor, "The Future of Television," Broadcast Engineering, NA, Dec. 1999, 1 page.

"About Us" web page from www.netflix.com, 1 page.

Web page printout for http://www.netflix.com/ on Jan. 17, 1999, at http://web.archive.org/web/19990117080920/ http://www.netflix.com, 5 pages.

The International Bureau of WIPO, "Notification Concerning Transmittal of Copy of International Preliminary Report on Patentability (Chapter I of the Patent Cooperation Treaty)", International application No. PCT/US2004/043119, mailed Nov. 22, 2007, 5 pages.

Claims, International application No. PCT/US2004/043119, 28 pages.

Business Wire, "Leading Online E-Commerce and Entertainment Retailers Endorse Andromedia's LikeMinds Personalization Server 3.0," New York: Jul. 15, 1999, located on the internet at http:// proquest.umi.com/psdweb?did=43177068&sid=13&Fmt=3 &clientId=19649&RQT=309&VName=PQD, retrieved on Apr. 16, 2007, 4 pages.

Wanger, et al., "Automated Circulation System in Libraries Serving the Blind and Physically Handicapped: A Reference Guide for Planning," May 15, 1981, 292 pages, Cuadra Associates.

Anguilla, "Southern Retailer Says 'Video Library' Makes Bookkeeping A Breeze," Jul. 1982, p. 22.

Anonymous, "Regional Reports: Central Region," Videostore, Jan. 1985, p. 146.

Anonymous, "Pop*Card Advertisements," The Oklahoman, 1982-1985, 8 pages.

Anonymous, "It-Had-To-Happen Department: Newest Ways To Rent Videos," Changing Times, Oct. 1985, p. 9.

Dreyfuss, "French Twist," Time Magazine, May 13, 1985, p. 8.

Dreyfuss, "French Twist," Fortune Magazine, May 13, 1985, p. 10.

Anonymous, PR Newswire, Sep. 10, 1985, pp. 1-2, PR Newswire Association.

Zacks, "Pssst! Hey, You! Wanna Buy 'Terminator' Cheap?," unknown publication, circa 1985, p. 1.

Anonymous, "The Cine Club Viewer," vol. 1, Jul. 1985, pp. 1-2, Cine Club Video.

Blauner, "Fast Track," New York Magazine, Oct. 7, 1985, p. 22.

Anonymous, "Exclusive in New York," Daily News (advertising supplement), Oct. 31, 1985, p. M1.

Morabito, unknown (letter and advertisement), Nov. 25, 1985, pp. 1-2 Cine Club Video.

Rodriguez, "System Self Study Workform: Functional Requirements," Texas State Library Division for the Blind & Physically Handicapped, Dec. 15, 1987, 14 pages.

Anonymous, "Audio Cassettes Catalog (1988)," Tape Rental Library, Inc., 1988, 122 pages.

Anonymous, "Audio Cassettes Catalog (1995)," Tape Rental Library, Inc., 1995, 118 pages.

Anonymous, "Have you Heard The Best Idea For Maintaining Your Competitive Edge", Tape Rental Library, Inc., 1989-1997, 16 pages.

Hattery, et al., "Maxcess Makes it Easy: A Midrange Library System," Information Retrieval & Library Automation, vol. 28 No. 11, Apr. 1993, 5 pages, Lomond Publications, Inc.

Anonymous, "Welcome To The Web!," Internet For Business, No. 1, May/Jun. 1996, pp. 1 and 5, Financial Times.

Anonymous, Avis Rent-A-Car web pages (downloaded from http://web.archive.org), 1996-1998, 138 pages, Avis.

Anonymous, "Books On Tape On-Line Order Form" (downloaded from http://web.archive.org), 1997-1999, 8 pages.

Anonymous, "More About B-O-T & Frequently Asked Questions" (downloaded from http://web.archive.org), 1999, 10 pages.

Anonymous, "Report: Sirsi Corporation," Library Technology Reports, Mar.-Apr. 1997, pp. 239-252, American Library Association.

Kuehner, "Serving Book Listeners Audio-Only Bookstore to Open Solon," The Plain Dealer, p. 1.B. (downloaded from Proquest), Nov. 11, 1998, 2 pages.

Anonymous, "Video Vendor Point Of Sale Software (Version 5.0) User Manual," no later then 1995, 3 pages, Multipost Retail Systems.

Anonymous, "Now Offering 30 Day Free Trial" (downloaded from www.archive.org), Apr. 1998, 3 pages, Business Training Library.

Anonymous, Advertisement, Oberlin News Tribune, Dec. 1, 1998, 1 page.

Anonymous, "Auto Librarian," Library Technology Reports, Mar.-Apr. 1999, pp. 234-247.

Anonymous, "Annual Report 1998," TiVo, Inc., Mar. 31, 1999, 99 pages.

Anonymous, NetFlix.com web pages, Jan.-Apr. 1999, 11 pages.

Anonymous, "First Online DVD Rental Stores Opens: Netflix Site Offers Unprecedented Title Selection, Availability and Convenience," Business Wire, Apr. 14, 1998, 3 pages.

Snoddy, "Coming Soon: Video Recorder That Picks The Programmes," London Times, Apr. 28, 1999, 2 pages.

Anonymous, "Briefly . . . ," USA Today, Apr. 28, 1999, 1 page.

Anonymous, "DIRECTV Inc. Announces Equity Investment in TiVo Inc., DIRECTV, TiVo Partner to Market Personal Television Service," Business Wire, Apr. 27, 1999, 2 pages.

Kuckinskas, "IQ News: Analysis—Six Degrees of Television," Adweek, Apr. 26, 1999, 2 pages.

Anonymous, "TiVo Selects Atmel's Smart Card Crytpo Controller for Authentication and Security; AT90SC3232C Offers Highest Security," Business Wire, Apr. 26, 1999, 1 page.

Anonymous, "Replay Networks Deals," Consumer Electronics, Apr. 26, 1999, 2 pages.

Shaffer, "Why Digital Devices Will Proliferate; Forget the Free PC," Fortune, Apr. 26, 1999, 2 pages.

Anonymous, "Interactive Video the Next Battleground," Inside Multimedia, Apr. 26, 1999, 2 pages.

Ojeda-Zapata, "Digital Devices Fun, But Prices Scary," Saint Paul Pioneer Press (Minnesota), Apr. 26, 1999, 2 pages.

Anonymous, "Interactive Services Debated," Television Digest, Apr. 26, 1999, 2 pages.

Anonymous, "Video Notes," Video Week, Apr. 26, 1999, 1 pg.

Stern, "Techies whip up biz at conflicted confab," Variety, Apr. 26-May 2, 1999, 2 pgs.

Walker, "Getting Personal with Television; New Digital VCRs Tailor Program Selection to Viewer' Taste—and Time," The Washington Post, Apr. 24, 1999, 3 pages.

Lewis, "State of the Art; Making Television Searchable," The New York Times, Apr. 22, 1999, 3 pages.

Graser, "Oracle sees VID on Demand in TV's Future," Daily Variety, Apr. 21, 1999, 2 pages.

Graser, "Dishing up DishPlayer," Daily Variety, Apr. 20, 1999, 1 page.

Alexander, "The new 'digital' VCRs are promising to remove the stress in finding something you enjoy watching on TV," Star Tribune (Minneapolis, MN), Apr. 20, 1999, 3 pages.

Healey, "Taming TV New Hard-Disk Recorders Let Viewers Pause Live Telecasts and Tape Shows by Category Bringing TV Under Control," San Jose Mercury News (California), Apr. 18, 1999, 4 pages.

Anonymous, Untitled, Press Release, Business Wire, Apr. 27, 1999, 1 page.

Anonymous, Untitled, Press Release, The Washington Post, Apr. 24, 1999, 1 page.

* cited by examiner

FIG. 7

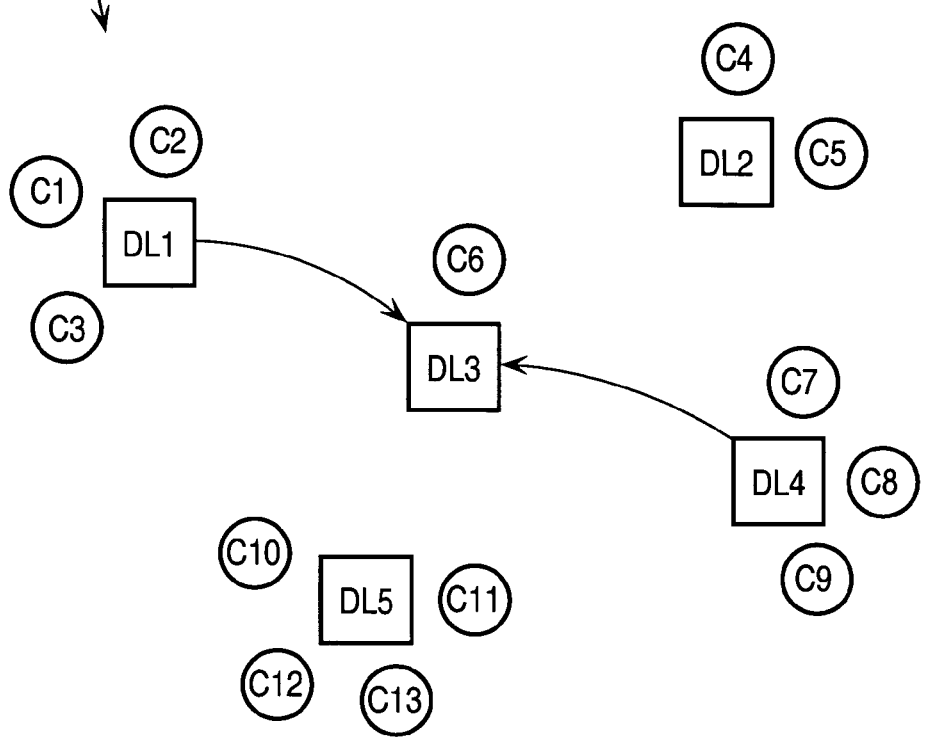

FIG. 8

802 — IDENTIFY FIRST SET OF RENTAL ITEMS AT FIRST DISTRIBUTION LOCATION THAT ARE NOT NEEDED BY CUSTOMERS ASSOCIATED WITH THE FIRST DISTRIBUTION LOCATION

804 — IDENTIFY SECOND SET OF RENTAL ITEMS AT SECOND DISTRIBUTION LOCATION THAT ARE NOT NEEDED BY CUSTOMERS ASSOCIATED WITH THE SECOND DISTRIBUTION LOCATION

806 — PROVIDE FIRST AND SECOND SETS OF RENTAL ITEMS FROM FIRST AND SECOND DISTRIBUTION LOCATIONS TO DESIGNATED DISTRIBUTION LOCATION

902 — RECEIVE PLURALITY OF RENTAL ITEMS RETURNED FROM CUSTOMERS

904 — PERFORM FIRST RETURN PROCESSING ON THE PLURALITY OF RENTAL ITEMS

906 — IDENTIFY, FROM PLURALITY OF RENTAL ITEMS, A SET OF ONE OR MORE RENTAL ITEMS NOT CURRENTLY NEEDED BY CUSTOMERS BUT EXPECTED TO BE NEEDED BY CUSTOMERS WITHIN A SPECIFIED TIME

908 — PERFORM SECOND RETURN PROCESSING ON SET OF ONE OR MORE RENTAL ITEMS

910 — RENT SET OF ONE OR MORE RENTAL ITEMS TO CUSTOMERS

APPROACH FOR MANAGING RENTAL ITEMS ACROSS A PLURALITY OF DISTRIBUTION LOCATIONS

FIELD OF THE INVENTION

The present invention relates to inventory rental, and more specifically, to an approach for renting items to customers.

BACKGROUND OF THE INVENTION

Conventional inventory rental models are typically based upon renting items for fixed rental periods and charging late fees for keeping rented items beyond a specified return date. These types of inventory models suffer from several significant limitations. First, conventional rental models require customers to make the decision of what items to rent at substantially the same time as the decision of when to rent the items. An example that illustrates this limitation is a video rental business. Customers go to a video rental store and select particular movies to rent at that time. The customers take the movies home and must return them by a particular due date or be charged a late fee. In this situation, the customers cannot decide what movies to rent before actually renting them. The customers may have a particular movie in mind, but there is no guarantee that the video rental store has the particular movie in stock. Moreover, due dates are inconvenient for customers, particularly for "new release" movies that are generally due back the next day.

Given the current demand for inventory rental and the limitations in the prior approaches, an approach for renting items to customers that does not suffer from limitations associated with conventional inventory rental models is highly desirable. In particular, an approach for renting inventory items to customers that allows separation of customers' decisions of what items to rent from when to rent the items is highly desirable.

There is a further need for an approach for renting items to customers on a continuous basis that avoids the use of fixed due dates or rental "windows" appurtenant to conventional rental models.

There is yet a further need for an approach for renting movies, games and music to customers that is more convenient and flexible to customers than conventional approaches.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 7 is a block diagram that depicts a distribution location arrangement that includes a plurality of distribution locations;

FIG. 8 is a flow diagram that depicts an approach for managing a plurality of rental items across a plurality of distribution locations according to an embodiment of the invention;

FIG. 9 is a flow diagram that depicts an approach for managing rental items by re-inserting rental items into inventory at a distribution location according to an embodiment of the invention.

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Various aspects and features of example embodiments of the invention are described in more detail hereinafter in the following sections: (1) functional overview; (2) item selection criteria; (3) item delivery; (4) "Max Out"; (5) "Max Turns"; (6) inventory management; (7) inventory management across multiple distribution locations; and (8) implementation mechanisms.

1. Functional Overview

Figure 1:
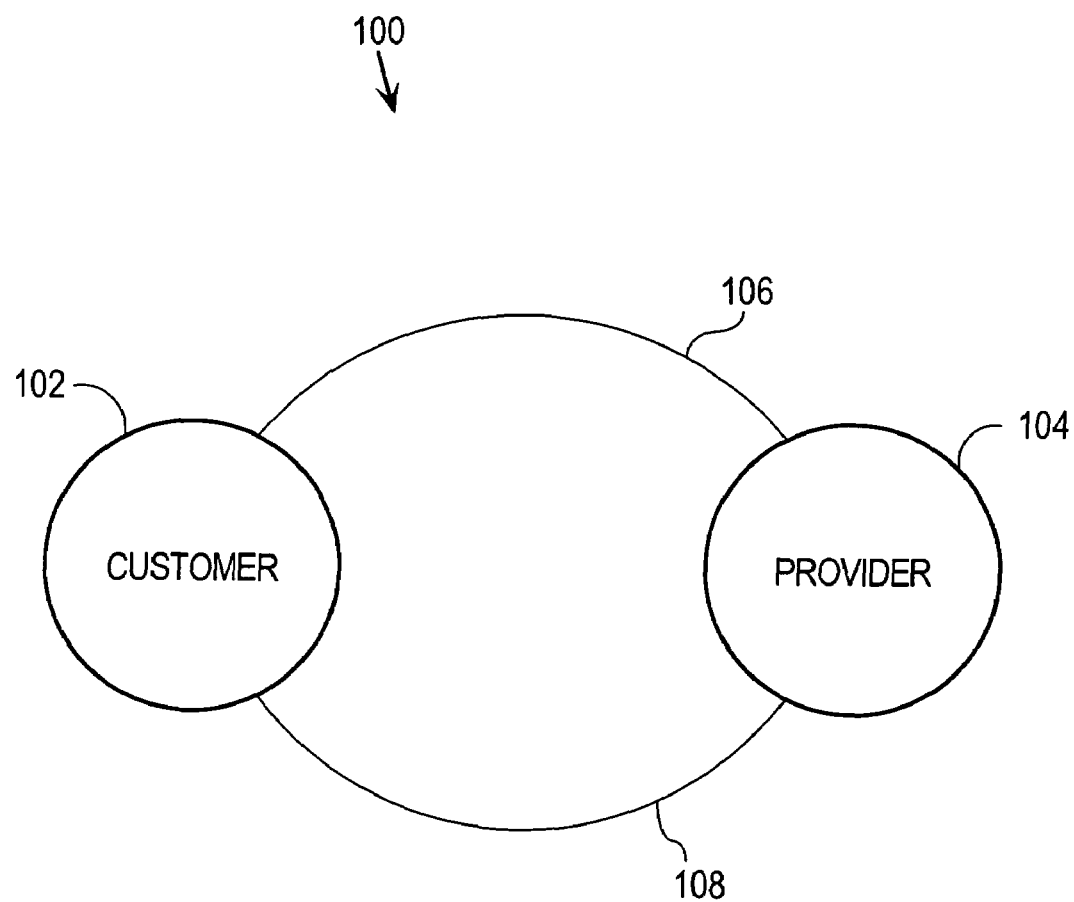
FIG. 1 is a diagram depicting an approach for renting items to customers according to an embodiment.

FIG. 1 is a block diagram 100 that illustrates an approach for renting items to customers according to various embodiments described herein. As used herein, the term "item" refers to anything that be rented to customers, for example, goods and items of commerce. Other examples include any type of digital media such as tape, magnetic media, optical media such as a Compact Disks (CDs), CD-ROMs or Digital Versatile Disks (DVDs), semiconductor-based storage devices, read-only memories and the like. The digital media may include any type of content and the invention is not limited to any type of content. Example content includes, without limitation, movies, music, games, computer software and any type of voice or narration.

In general, the decision of what items to rent is separated from the decision of when to rent the items. Customers specify items to rent using one or more item selection criteria separate from deciding when to receive the specified items. Furthermore, customers are not constrained by conventional rental "windows" and instead can have continuous, serialized rental of items.

According to one embodiment, a customer 102 provides one or more item selection criteria to a provider 104 over a link 106. Link 106 may be any medium for transferring data between customer 102 and provider 104 and the invention is not limited to any particular medium. Examples of link 106 include, without limitation, a network such as a LAN, WAN or the Internet, a telecommunications link, a wire or optical link or a wireless connection.

The item selection criteria indicate items that customer 102 desires to rent from provider 104. In response to receiving the item selection criteria from customer 102, provider 104 provides the items indicated by the item selection criteria to customer 102 over a delivery channel 108. Delivery channel 108 may be implemented by any mechanism or medium that provides for the transfer of items from provider 104 to customer 102 and the invention is not limited to any particular type of delivery channel. Examples of delivery channel 108 include, without limitation, mail delivery, courier delivery or delivery using a delivery agent. Provider 104 may be centralized or distributed depending upon the requirements of a particular application.

According to an embodiment, a "Max Out" approach allows up to a specified number of items to be rented simultaneously to customer 102 by provider 104. According to another embodiment, a "Max Turns" approach allows up to a specified number of item exchanges to occur during a specified period of time. The "Max Out" and "Max Turns" approaches may be used together or separately with a variety of subscription methodologies.

Figure 2:
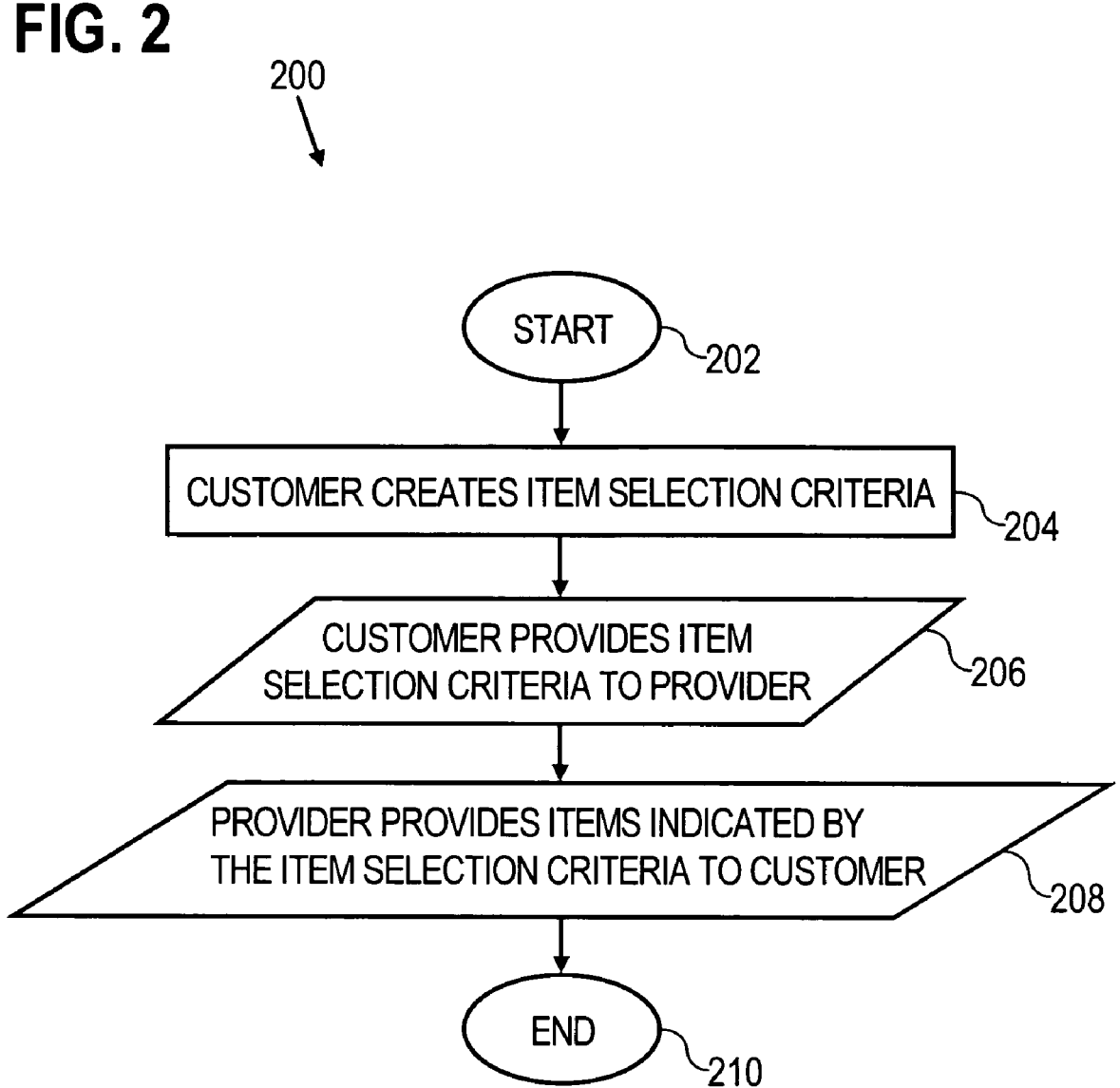
FIG. 2 is a flow diagram depicting an approach for renting items to customers according to an embodiment.

The approach just described for renting items to customers is now described with reference to a flow diagram 200 of FIG. 2. After starting in step 202, in step 204, customer 102 creates item selection criteria. In step 206, customer 102 provides the item selection criteria to provider 104. In step 208, in response to provider 104 receiving the item selection criteria from customer 102, provider 104 provides one or more items indicated by the item selection criteria to customer 102. The process is complete in step 210.

2. Item Selection Criteria

The one or more item selection criteria provided by customer 102 to provider 104 indicate the particular items that customer 102 desires to rent from provider 104. Thus, the item selection criteria define a customer-specific order queue that is fulfilled by provider 104. According to one embodiment, the item selection criteria specify attributes of items to be provided by provider 104 to customer 102. Item selection criteria may specify any type of item attributes and the invention is not limited to particular item attributes. Examples of item attributes include, without limitation, identifier attributes, type attributes and cost attributes. Item selection criteria may be changed at any time to reflect changes in items that customers desire to rent from a provider.

3. Item Delivery

According to one embodiment, items are delivered by provider 104 to customer 102 over delivery channel 108 based upon item delivery criteria. More specifically, the delivery of items from provider 104 to customer 102 is triggered by item delivery criteria being satisfied. The item delivery criteria may include a wide range of criteria and the invention is not limited to any particular item delivery criteria. Examples of item delivery criteria include, without limitation, customer request/notification, customer notification that an item is being returned, notification by a third party, such as a post office, that an item is being returned, customer return of an item, the occurrence of a specified date, the elapsing of a specified period of time or a customer payment.

The item delivery criteria may be specified by customer 102 to provider 104 or negotiated by customer 102 and provider 104 as part of a subscription service. For example, a particular subscription service may include item delivery criteria that specifies that a particular number of items are to be delivered monthly. As another example, item delivery criteria may specify that an initial set of items is to be delivered by provider 104 to customer 102 upon initiation of a subscription service and that additional items are to be delivered to customer 102 upon return of items to provider 104. Item delivery criteria may be applied uniformly to all items to be delivered to a customer, or may be item specific. For example, item delivery criteria may specify a particular date, i.e., the third Wednesday of every month, for all item deliveries. Alternatively, separate item delivery dates may be assigned to each item.

4. "Max Out"

According to one embodiment, a "Max Out" approach is used to manage the number of items that may be simultaneously rented to customers. According to the "Max Out" approach, up to a specified number of items may be rented simultaneously to a customer. Thus, the "Max Out" approach establishes the size of an inventory of items that may be maintained by customers. The specified number of items may be specific to each customer or may be common to one or more customers. In the present example, if the specified number of items is three, then up to three items may be rented simultaneously by provider 104 to customer 102. If the specified number of items are currently rented to customer 102 and the specified item delivery criteria triggers the delivery of one or more additional items, then those items are not delivered until one or more items are returned by customer 102 to provider 104.

According to one embodiment, in situations where the specified number of items are currently rented to customer 102 and the specified item delivery criteria triggers the delivery of one or more additional items, then the one or more additional items are delivered to customer 102 and customer 102 and a surcharge is applied customer 102. The specified number of items may then be increased thereafter to reflect the additional items delivered to customer 102 and increase the size of the inventory maintained by customer 102. Alternatively, the specified number of items may remain the same and number of items maintained by customer 102 returned to the prior level after items are returned to provider 104 by customer 102. When used in conjunction with the "Max Turns" approach described hereinafter, the specified number of items may be unlimited.

Figure 3:
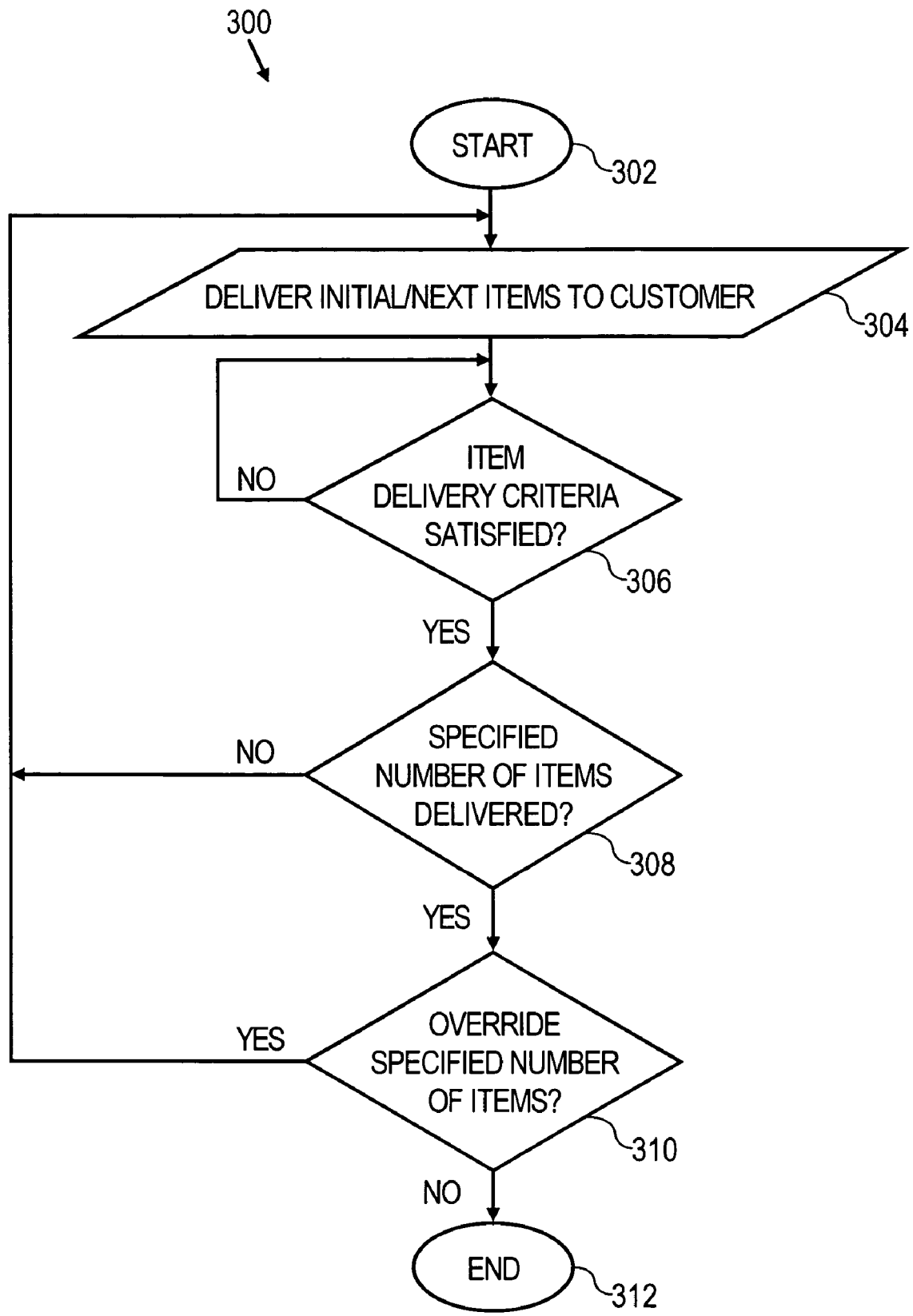
FIG. 3 is a flow diagram depicting a "Max Out" approach for renting items to customers according to an embodiment.

The "Max Out" approach for managing the number of items that may be simultaneously rented to customers is now described with reference to a flow diagram 300 of FIG. 3. After starting in step 302, in step 304, one or more initial items are delivered to customer 102 to establish the inventory maintained by customer 102. Note that an initial delivery of items is not required and according to one embodiment, the inventory of customer 102 is incrementally established over time.

In step 306, a determination is made whether the item delivery criteria have been satisfied. If not, then the determination continues to be made until the item delivery criteria are satisfied. As described previously herein, the delivery criteria may include customer notification generally, customer notification that an item is being returned, the actual return of an item, the occurrence of a specific date, or that a specified amount of time has elapsed.

Once the item delivery criteria are satisfied, then in step 308, a determination is made whether the specified number of items have been delivered. If not, then control returns to step 304 and one or more additional items are delivered by provider 104 to customer 102. If however, in step 308, the specified number of items have been delivered, then in step 310, a determination is made whether the specified number of items, i.e., the "Max Out" limit, is to be overridden. As previously described, the specified number of items may be overridden by increasing the specified number of items, i.e., the "Max Out" limit, to allow additional items to be delivered to customer 102 and charging a fee to customer 102. Alternatively, the specified number of items is not changed and a surcharge applied to customer 102. This process continues for the duration of the subscription and is then complete in step 312.

5. "Max Turns"

According to one embodiment, a "Max Turns" approach is used to rent items to customers. According to the "Max Turns" approach, up to a specified number of item exchanges may be performed during a specified period of time. For example, referring to FIG. 1, suppose that provider 104 agrees to rent items to customer 102 with a "Max Turns" limit of three items per month. This means that customer 102 may make up to three item exchanges per month. This approach may be implemented independent of the number of items that a customer may have rented at any given time under the "Max Out" approach. The approach is also independent of the particular item delivery criteria used.

According to one embodiment, the "Max Turns" approach is implemented in combination with the "Max Out" approach to rent items to customers. In this situation, up to a specified number of total items are simultaneously rented to customer 102 and up to a specified number of item exchanges may be made during a specified period of time. Thus, using the "Max Out" and the "Max Turns" approaches together essentially establishes a personal item inventory for customer 102 based upon the "Max Out" limit that may be periodically refreshed based upon the "Max Turns" limit selected.

In some situations, customer 102 may wish to exchange more than the specified number of items during a specified period. According to one embodiment, in this situation, provider 104 agrees to rent additional items above the specified number to customer 102 and to charge customer 102 for the additional items. For example, suppose that provider 104 agrees to rent items to customer 102 with up to three item turns (exchanges) per month. If, in a particular month, customer 102 requires two additional turns, then the two additional items are provided to customer 102 and a surcharge is applied to customer 102 for the additional two items.

In other situations, customer 102 may not use all of its allotted turns during a specified period. According to one embodiment, customers lose unused turns during a subscription period. For example, if customer 102 has a "Max Turns" limit of four item exchanges per month and only makes two item exchanges in a particular month, then the two unused exchanges are lost and cannot be used. At the start of the next month, customer 102 would be entitled to four new item exchanges.

According to another embodiment, customers are allowed to carry over unused turns to subsequent subscription periods. For example, if customer 102 has a "Max Turns" limit of four item exchanges per month and only makes two item exchanges in a particular month, then the two unused exchanges are lost and cannot be used. At the start of the next month, customer 102 would be entitled to six new item exchanges, two from the prior month and four for the current month.

Figure 4:
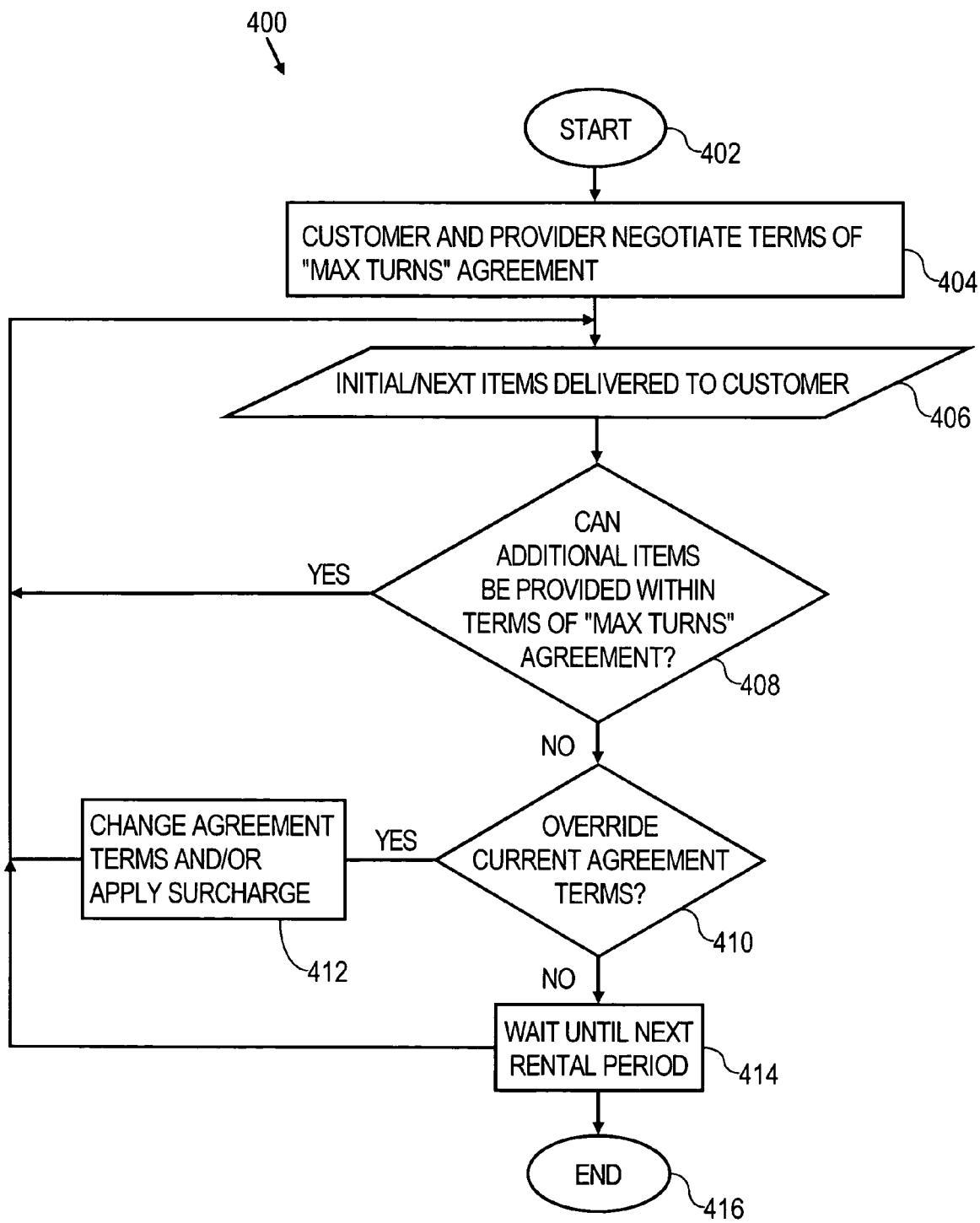
FIG. 4 is a flow diagram depicting a "Max Turns" approach for renting items to customers according to an embodiment.

The "Max Turns" approach for renting items to customers is now described with reference to a flow diagram 400 of FIG. 4. After starting in step 402, in step 404, customer 102 and provider 104 agree upon the terms of the "Max Turns" agreement. Specifically, customer 102 and provider 104 agree at least upon the maximum number of turns that are allowed in a specified period of time.

In step 406, in response to one or more item delivery criteria being satisfied, provider 104 provides one or more items to customer 102 over delivery channel 108. Any type of item delivery criteria may be used with the "Max Turns" approach and the invention is not limited to any particular delivery criteria. For example, the initial one or more items may be delivered to customer 102 in response to a subscription payment made by customer 102 to provider 104, the initiation of a specified subscription period, or by request of customer 102 for the initial rental items. The number of initial one or more items must not exceed the terms of the "Max Turns" agreement.

In step 408, in response to one or more delivery criteria being satisfied, a determination is made whether additional items can be provided to customer 102 within the terms of the "Max Turns" agreement. For example, if the number of items rented to customer in the current subscription period is less than the agreed-upon "Max Turns," then additional items can be rented to customer 102 within the terms of the "Max Turns" agreement. In this situation, this determination may be made in response to customer 102 returning one or more items to provider 104, or by customer 102 requesting additional items.

If, in step 408, a determination is made that additional items can be rented to customer 102 within the terms of the "Max Turns" agreement, then control returns to step 406 where one or more additional items are rented to customer 102. If however, in step 408, a determination is made that additional items cannot be rented to customer 102 within the terms of the "Max Turns" agreement, then in step 410, a determination is made whether to override the current agreement terms. If so, then in step 412, the agreement terms are changed to allow for a larger number of terms and customer 102 is charged accordingly, or the terms are left unchanged and a surcharge is applied for the additional items to be delivered. Control then returns to step 406, where one or more additional items are delivered to customer 102.

If in step 410, a determination is made that the current agreement is not to be overridden, then in step 414, no items are delivered to customer 102 until the next subscription period. For example, the request for additional items may be received at the end of a subscription period and instead of renting the additional items immediately, they are instead delivered during the subsequent subscription period. Control then returns to step 406 where one or more additional items are rented to customer or the process is complete in step 416.

Figure 5:
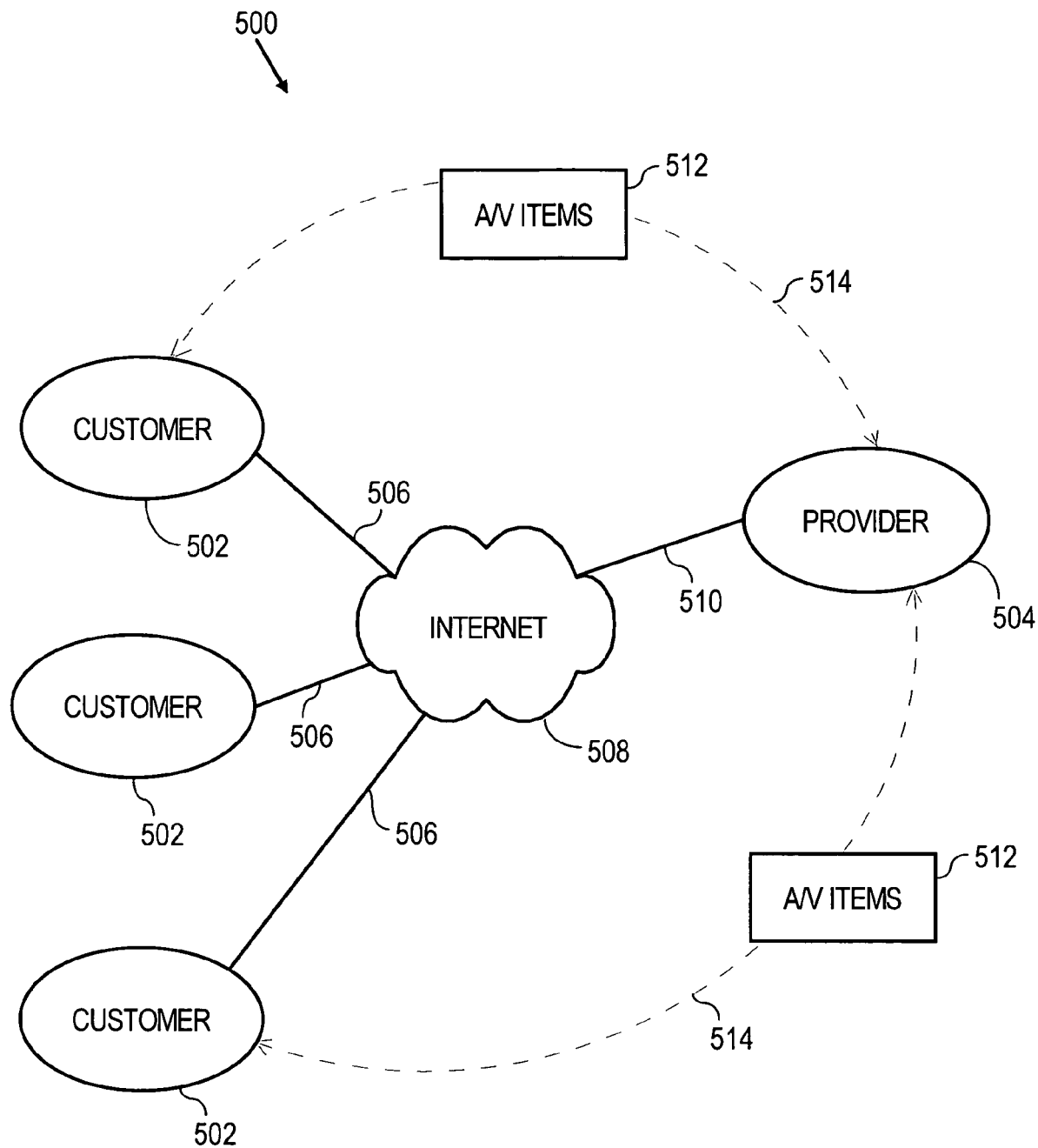
FIG. 5 is a diagram depicting an approach for renting audio/video items to customers over the Internet according to an embodiment.

The approach for renting items described herein is now described in the context of renting to customers audio/video (A/V) items, such as movies, games and music, stored on various media. FIG. 5 is a diagram 500 that depicts a set of customers 502 that desire to A/V items from a provider 504. Customers 502 communicate with provider 504 over links 506, the global packet-switched network referred to as the "Internet," and a link 510.

Links 506 and 510 may be any medium for transferring data between customers 502 and the Internet 508 and between the Internet 508 and provider 504, respectively, and the invention is not limited to any particular medium. In the present example, links 506 and 510 may be connections provided by one or more Internet Service Providers (ISPs) and customers 502 are configured with generic Internet web browsers. Links 506 and 510 may be secure or unsecured depending upon the requirements of a particular application.

In accordance with an embodiment, customers 502 enter into a rental agreement with provider 504 to rent audio/video (A/V) items 512 from provider 504 according to the "Max Out" and/or "Max Turns" approaches described herein. The invention is not limited to any particular approach for entering into the rental agreement. For example, customers 502 and provider 504 may enter into a rental agreement by mail, telephone or over the Internet, by customers 502 logging into a web site associated with provider 504.

Customers 502 create and provide item selection criteria to provider 504 over links 506 and 510 and the Internet 508. The invention is not limited to any particular approach for specifying and providing item selection criteria to provider 504. For example, according to one embodiment, customers 502 provide item selection criteria to provider 504 in one or more data files. According to another embodiment, customers 502 log onto a web site of provider 504 and use a graphical user interfaced (GUI) to specify attributes of the movies and music that customers desire to rent from provider 504.

The item selection attributes may include any attributes that describe, at least in part, movies, games or music that customers 502 desire to rent. For movies, example attributes include, without limitation, title, category, director name, actor name and year of release. For games, example attributes include, without limitation, title and category. For music, example attributes include, without limitation, title, category, artist/group name and year of release. Customers 502 may identify specific movies or music by the item selection criteria, or may provide various attributes and allow provider 504 to automatically select particular movies and music that satisfy the attributes specified. For example, customers 502 may specify item selection criteria that include horror movies released in 1999 and let provider 504 automatically select horror movies that were release in 1999. As another example, customers 502 may specify item selection criteria that include adventure movies starring Harrison Ford. Customers 502 may also specify an order or priority for the specified item selection criteria. For example, customers 502 may specify specific movie titles and the order in which they want to receive them. As another example, customers 502 may specify that they want to receive a particular number of movies of different types.

Once customers 502 and provider 504 have entered into a rental agreement and customers 502 have provided item selection criteria to provider 504, then A/V items 512 are rented to customers 502 over delivery channels 514 in accordance with the terms of the rental agreement. Specifically, according to the "Max Out" approach described herein, an initial set of A/V items 512, such as movies, games and music, are delivered to customers 502 over delivery channels 514 according to the terms of the rental agreement. Subsequent A/V items 512 are delivered whenever the specified item delivery criteria are satisfied. For example, additional A/V items 512 may be delivered upon the return of one or more A/V items 512 to provider, a request from customers 502, the arrival of a particular date, e.g., a specific day of the month, or the expiration of a specified period of time, e.g., fifteen days.

In accordance with the "Max Out" approach described herein, once the maximum number of A/V items 512 have been rented to a particular customer 502, then no additional A/V items 512 are rented until one or more rented A/V items 512 are returned to provider 504, or unless a surcharge is applied to the particular customer 502. Alternatively, the rental agreement between the particular customer 502 and provider 504 may be modified to increase the maximum number of A/V items 512 that may be rented simultaneously to the particular customer 502.

The rental agreement between customers 502 and provider 504 may also specify a maximum number of turns in combination with the "Max Out" approach. In this situation, a maximum number of turns restricts how quickly customers 502 may refresh their A/V item 512 inventories. For example, suppose that a particular customer 502 agrees with provider 504 to rent up to four movies with a maximum of four turns per month. Under this agreement, the particular customer 502 may maintain a personal inventory of up to four movies and rent four new movies per month. Thus, the particular customer 502 can completely "replace" his personal inventory once per month. If the particular customer 502 agreed to a maximum of up to eight turns per month, then the particular customer 502 would be able to completely replace his personal inventory twice per month.

Provider 504 is illustrated as a single entity for purposes of explanation only. Provider 504 may be centralized or distributed depending upon the requirements of a particular application. For example, provider 504 may be a central warehouse from which all A/V items 512 are provided. Alternatively, provider 504 may be implemented by a network of distributed warehouses.

Figure 6:
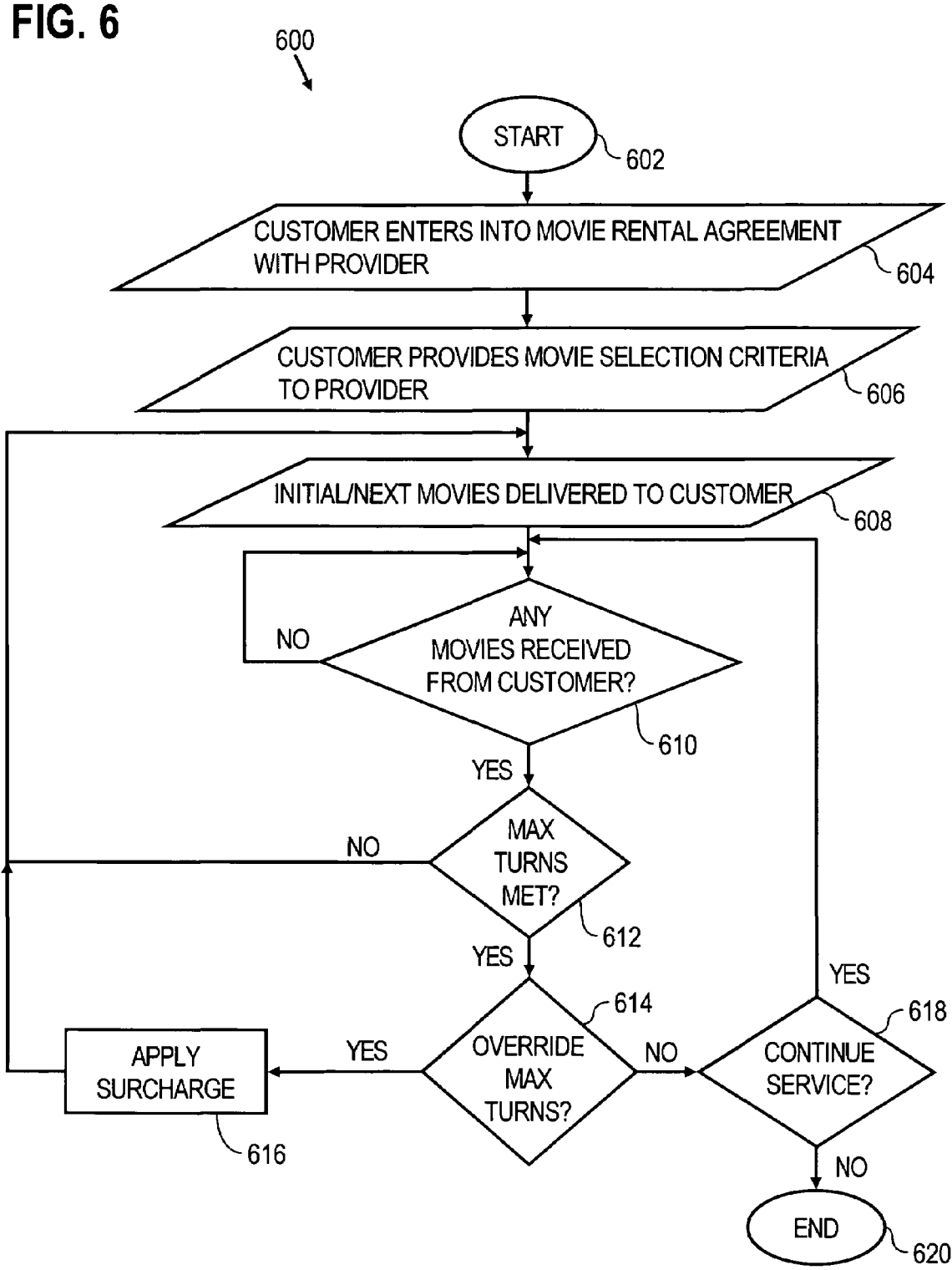
FIG. 6 is a flow diagram illustrating an approach for renting audio/video items to customers over the Internet using both "Max Out" and "Max Turns" according to an embodiment.

FIG. 6 is a flow diagram that illustrates an approach for renting A/V items 512, e.g., movies, to customers over a communications network such as the Internet using both "Max Out" and "Max Turns" according to an embodiment. Referring also to FIG. 5, after starting in step 602, in step 604, a customer 502 enters into a rental agreement with provider 504. In the present example, customer 502 uses a generic web browser to access an Internet web site associated with provider 504 and enter into a rental agreement that specifies that customer 502 may maintain a personal inventory of four movies ("Max Out" of four) and receive up to four new movies per month ("Max Turns" of four). Furthermore, the rental agreement specifies that new movies will be delivered upon return of a rented movie from customer 502, i.e., the delivery criteria is a return of a movie by the customer.

In step 606, customer 502 creates and provides movie selection criteria to provider 504 that indicates movies that customer 502 desires to rent. For example, the movie selection criteria may specify particular movie titles that customer 502 desires to rent. The movie selection criteria may also specify an order or priority in which customer 502 wishes to rent the movies. Instead of identifying particular movie titles, the movie selection criteria may specify movie preferences for customer 502, e.g., types of movies, directors, actors, or any other movie preferences or attributes. In this situation, provider 504 automatically selects particular titles that satisfy the movie selection criteria. For example, the movie selection criteria may specify a preference for action movies starring a particular actor, with a preference for "new release" movies. Provider 504 attempt to provide movies to customer 502 that best satisfy the preferences indicated by the movie selection criteria.

In step 608, one or more initial movies 512 are delivered to customer 502 over delivery channel 514. The one or more initial movies 512 may be delivered to customer 502 via mail, courier, delivery agent or any other suitable means negotiated between customer 502 and provider and the invention is not limited to any particular type of delivery mechanism. For purposes of explanation only, is presumed in the present example that movies are mailed between customer 502 and provider 504.

The one or more initial movies 512 establish the personal movie inventory of customer 502. Customer 502 may choose to receive any number of movies up to the "Max Out" limit of four movies. Typically, customer 502 will choose to initially receive four movies in the initial delivery.

Once the one or more initial movies 512 have been mailed to customer 502, then in step 610, a determination is made whether any movies 512 have been returned by customer 502 to trigger another movie delivery. In the present example, the delivery of additional movies is triggered by the receipt, e.g., via mail, of one or more movies from customer 502. In the situation where customer 502 elects to not receive the maximum number of movies 512 in the initial delivery, then the delivery of additional movies 512 may also be triggered by a request from customer 502 for additional movies 512. For example, customer 502 may notify provider 504 via telephone, email or by accessing the web site associated with provider 504.

If, in step 610, a determination is made that one or more movies 512 were received from customer 502, then in step 612, a determination is made whether the maximum number of turns ("Max Turns") limit has been reached for the current cycle. In the present example, a determination is made whether four or more movies have been mailed in the current month. If not, then control returns to step 608, where one or more additional movies 512 are mailed to customer 502 via delivery channel 514 up to the "Max Out" limit of four.

If, in step 612, a determination is made that the "Max Turns" limit has been met for the current cycle, i.e., in the present example, four movies 512 have been mailed to customer 502 in the current month, then in step 614 a determination is made whether to override the current "Max Turns" limit. If so, then in step 616, a surcharge is applied to customer 502 and control returns to step 608 where the additional movies 514 are mailed to customer 502. If not, then in step 618, a determination is made whether to continue the subscription service. If so, then no additional movies are mailed to customer 502 during the current cycle, e.g., the current month, and the control returns to step 610. If, in step 618, a determination is made that service is not to be continued, then the process is complete in step 620.

In some situations, customer 502 may desire to increase or decrease the size of customer's 502 personal movie inventory by changing the current "Max Out" limit. According to one embodiment, customer 502 notifies provider 504, e.g., by telephone, mail, email or by accessing the web site associated with provider 504, that customer 502 wishes to change the "Max Out" limit. The movie rental agreement between customer 502 and provider 504 is then modified to reflect the change of the "Max Out" limit. In the situation where the "Max Out" limit is increased, then additional movies 512 may be immediately mailed to customer 502.

6. Inventory Management

The approach described herein for renting items to customers provides superior inventory management to prior approaches. Specifically, the use of item selection criteria provides for efficient inventory management by allowing the greatest number of items to be rented at any given time. Moreover, the greatest number of customers are provided with their most preferred items. For example, customers may specify priorities for the items indicated by the item selection criteria. Thus, if a particular customer's first choice is not available, or already rented, then the item having the next highest priority can be rented to the particular customer. According to one embodiment, customers may indicate items that are not yet available for rent. Then, the items are delivered to customers when they become available.

For example, referring again to FIG. 5, suppose that a particular customer 502 desires to rent an as-yet-unreleased movie entitled "ABC." The particular customer 502 indicates this movie to provider 504 by the item selection criteria. Since the movie ABC is not yet available, it cannot be delivered to the particular customer 502. However, when the movie ABC does become available, it can be shipped immediately to the particular customer 502, as well as other customers 502 who may have also requested the movie. This allows provider 504 to maximize the number of items rented while ensuring that customers 502 are able to rent the highest priority items that they requested.

According to another embodiment, as yet unknown items may also be rented by specifying attributes of the unknown items. For example, the particular customer 502 may request to rent the next new movie of a particular director, for which the exact name is unknown to the particular customer. As another example, the particular customer 502 may request to rent the next album of a particular group that is currently in process and does not yet have a title.

7. Inventory Management Across Multiple Distribution Locations

Some rental systems use multiple distribution locations to provide rental items to customers. The distribution locations are typically distributed geographically to provide the best availability to customers. In some situations, multiple distribution locations are disposed in close proximity to each other to provide load balancing and redundancy, for example in dense population areas. As used herein, the term "distribution location" refers to a location from which rental items are provided to customers. Example distribution locations include, without limitation, distribution centers, warehouses and hubs. The types and arrangement of distribution locations may vary depending upon the requirements of a particular application and the invention is not limited to any particular types or arrangement of distribution locations.

One of the issues in rental systems is how to provide the best service to the largest number of customers. From a theoretical standpoint, the best service is provided by establishing a number of geographically disparate and autonomous distribution locations that are structured and operated identically. Each distribution location maintains enough units of each rental item so that customer demand at each distribution location can always be satisfied by the local distribution location. In reality, this approach is very expensive and impractical because at any given distribution location there are always some rental items that are not wanted by any customers and other rental items that are wanted by customers that a particular distribution location does not have. For example, in the context of renting movies on DVDs to customers using a group of distribution locations, it is highly likely that there will always be movie titles at a particular distribution location that customers do not want to rent and other movies titles that customers want to rent, but for which the particular distribution location does not have a sufficient number of copies in inventory. Given changing customer demand over time, each distribution location would need to store many thousands of DVDs to ensure the customer demand could always be satisfied. This would necessarily include storing copies of unpopular movie titles that may be rented only very infrequently and also storing many extra copies of popular movie titles to ensure that customer demand can be satisfied. Thus, given the costs associated with maintaining rental inventory, the problem is how to maintain as little rental inventory as is possible, while still being able to satisfy customer demand.

A. Inventory Free Distribution Locations

According to one embodiment of the invention, an "inventory free" approach is used for managing rental item inventory across multiple distribution locations. In general, at least some rental items that are not needed by two or more distribution locations are sent from the two or more distribution locations to a designated distribution location. For example, a first set of one or more rental items at a first distribution location that are not be needed at the first distribution location is identified. A second set of one or more rental items at a second distribution location that are not needed at the second distribution location is also identified. The first and second sets of one or more rental items are sent from the first and second distribution locations to the designated distribution location. Rental items sent to the designated distribution location may be permanently stored at the designated distribution location. Alternatively, rental items sent to the designated distribution location may be returned to the distribution location from which they were sent, or sent to other distribution locations, depending upon where the rental items are needed.

This approach for managing rental item inventory across multiple distribution locations at least reduces the amount of rental item inventory that must be maintained at individual distribution locations. In some situations, the approach allows distribution locations to be inventory free, meaning that the distribution locations do not maintain any inventory and that all rental items received by the distribution location are either rented to customers or sent to the designated distribution location.

FIG. 7 is a block diagram that depicts a distribution location arrangement 700 that includes a plurality of distribution locations identified as DL1-DL5. One or more customers C1-C13 are associated with each distribution location DL1-DL5. The fact that a particular customer is associated with a particular distribution location means that the particular customer receives rental items from the particular distribution location. In the present example, customers C1-C3 are associated with distribution location DL1. Customers C4 and C5 are associated with distribution location DL2. Customer C6 is associated with distribution location DL3. Customers C7-C9 are associated with distribution location DL4 and customers C10-C13 are associated with distribution location DL5.

FIG. 8 is a flow diagram 800 that depicts an approach for managing a plurality of rental items across a plurality of distribution locations according to an embodiment of the invention. In step 802, a first set of one or more rental items at a first distribution location that are not be needed by customers associated with the first distribution location is identified. For example, a first set of one or more rental items, such as DVDs containing movies or music, at distribution location DL1 that are not needed by customers C1-C3 is identified.

In step 804, a second set of one or more rental items at a second distribution location that are not needed by customers associated with the second distribution location is identified. For example, a second set of one or more rental items, such as DVDs containing movies or music, at distribution location DL4 that are not be needed by customers C4 and C5 is identified.

In step 806, the first and second sets of rental items are provided from the first and second distribution locations to a designated distribution location. The designated distribution location may be selected based upon a wide variety of selection criteria, depending upon the requirements of a particular application, and the invention is not limited to any particular selection criteria. For example, the designated distribution location may be selected because of its geographical proximity to the remaining distribution locations. As another example, the designated distribution location may be selected based upon its capacity to store and manage rental items sent to it from other distribution locations. In the present example, distribution location DL3 is selected as the designated distribution location. Thus, the first set of rental items is provided from distribution location DL1 to distribution location DL3. Also, the second set of rental items is provided from distribution location DL4 to distribution location DL3.

The particular mechanism employed to send the first and second sets of rental items from the first and second distribution locations to the designated distribution location may vary depending upon the particular application and the invention is not limited to any particular approach. For example, in an application where rental items are digital media, such as CDs, CD-ROMs or DVDs, the rental items may be hand carried or shipped by mail or courier or sent by other bulk transportation means.

Rental items may also be returned from the designated distribution location back to distribution locations that require the rental items. For example, suppose that a particular rental item was not required by distribution location DL1 and was sent to the designated distribution location DL3 as previously described. Sometime later, a determination is made that the particular rental item is now required by distribution location DL1. This may occur, for example, if a customer associated with distribution location DL1 requests the particular rental item. In this situation, the particular rental item is returned from the designated distribution location DL3 to distribution location DL1. Rental items are not limited to being returned to the distribution locations from which they were provided to the designated distribution location. For example, suppose that distribution location DL5 indicates a need for the particular rental item that was previously provided to the designated distribution location DL3 from distribution location DL1. In this situation, the particular rental item is provided from the designated distribution location DL3 to distribution location DL5.

In the prior example, distribution locations exchange items with the designated distribution location. According to another embodiment of the invention, distribution locations exchange inventory directly with other distribution locations. For example, distribution location DL1 may provide rental items not needed by distribution location DL1 directly to another distribution that needs the rental items, such as distribution location DL2. Distribution locations with excess inventory may also sending excess rental items directly to the customers of another distribution location. In the prior example, distribution location DL1 sends excess rental items directly to customers C4 and C5. The rental items may then be returned from customers C4 and C5 to either distribution location DL2, or back to distribution location DL1, depending upon where the rental items are needed. This approach reduces the amount of time that rental items are "out of service" attributable to being in transit between distribution locations.

Although the approach is depicted in the figures and described in the context of five distribution locations and thirteen customers, the approach is applicable to any number of distribution locations and any number of customers.

B. Re-Insertion of Rental Items into Inventory at Distribution Locations

According to the "inventory free" approach described above, at least some rental items that are not needed by customers associated with distribution locations are sent to the designated distribution location. There may be situations where particular rental items are not currently needed by customers at a distribution location, but there is a high likelihood that the particular rental items will be needed by the customers within a specified time. For example, the demand for the particular rental items may be generally high at other distribution locations and it is expected that customers associated with the distribution location will request to rent the particular rental items within a specified time. According to one embodiment of the invention, in this situation, the particular rental items are maintained at the distribution location as "float" and not sent to the designated distribution location. Also, the particular rental items are re-processed as returned rental items prior to being again rented to customers.

FIG. 9 is a flow diagram 900 that depicts an approach for managing rental items by re-inserting rental items into inventory at a distribution location according to an embodiment of the invention. In step 902, a plurality of rental items is received at a distribution location from customers. For example, a plurality of DVDs containing movies returned by customers C1-C3 is received at distribution location DL1.

In step 904, a first return processing is performed on the received plurality of rental items. Return processing may include many different types of processing, depending upon the requirements of a particular application, and the invention is not limited to any particular type of return processing. For example, return processing may include recording that a particular rental item rented to a customer has been received at a distribution location. The recording may be made manually into an information system. Alternatively, a rental item may be scanned, for example using a bar code reader, either manually or automatically by a machine. In the present example, the first return processing includes scanning a label, bar code or other encoding on each DVD to record in an information system that each DVD in the plurality of DVDs has been received by the distribution location DL1.

In step 906, the plurality of rental items is evaluated and a set of one or more rental items is identified from the plurality of rental items. The set of one or more rental items are rental items that are not currently needed by customers associated with the distribution location, but that are likely to be needed by the customers within a specified time.

In the present example, the plurality of DVDs is evaluated and a set of one or more DVDs is identified that is not currently needed by customers C1-C3 of distribution location DL1, but that is likely to be needed by customers C1-C3. The set of one or more DVDs is the "float" for distribution location DL1 and may be maintained separate from other DVDs at distribution location DL1. As described in more detail hereinafter, the determination that a particular rental item is not currently needed but is expected to be needed within a specified time may be made based upon a variety of factors that may vary depending upon the requirements of a particular application.

The specified time may be selected based upon a variety of considerations. According to one embodiment of the invention, the specified time is selected based upon the cost of maintaining a rental item at a distribution location and the costs of returning the rental item to the designated distribution location and then retrieving the rental item back from the designated distribution location. For example, the specified time may be selected so that the cost of maintaining the rental item at a distribution location for the specified time is approximately equivalent to returning the rental item to and later retrieving the rental item from the designated location. Thus, if the rental item is likely to be needed by customers within the specified time, then it is cost effective to keep the rental item at the distribution location. On the other hand, if it is not likely that the rental item will be needed by customers within the specified time, then it is cost effective to send the rental item to the distribution location and later retrieve the rental item when it is needed.

In step 908, a second return processing is performed on the set of one or more rental items prior to being rented to customers. In the present example, the label, bar code or other encoding on each DVD in the set of one or more DVDs is re-scanned. The second return processing may be performed separately, or together with other DVDs returned to distribution location DL1. For example, the set of one or more DVDs may be mixed with other DVDs returned from customers C1-C3 and scanned together as a single batch.

In step 910, the set of one or more rental items is sent to the customers that requested the rental items. In the present example, the set of one or more DVDs is sent from distribution location DL1 to customers C1-C3.

This approach results in the float being re-scanned prior to being rented again and avoids having to put the float back into inventory or organize the float in any way. Instead, the float has to simply be maintained until it is re-scanned.

The aforementioned process may be repeated any number of times to dynamically update the float. For example, once additional rental items received and the current float have been scanned, a new float may be determined. The new float may be identical to the current float. This would occur if all of the additional rental items are requested by customers and none of the rental items in the float are requested by customers, but a likelihood still remains that the rental items in the float will be requested by customers within a specified time. Some of the rental items in the current float may not be in the new float. This would occur if rental items in the current float have been requested by and rented to customers and are therefore not included in the new float. The new float may also contain new rental items that were not in the old float. This would occur if a determination is made that one or more rental items from the additional rental items are not needed by customers of the distribution location and therefore should be added to the float. Thus, the contents of the float may change over time and any portion of the float may be replaced at any time. There may also be some situations where the float disappears completely. This would occur if a determination is made that all of the rental items in the float are needed b customers.

C. Determining Whether a Rental Item is Needed at a Distribution Location

The determination of whether a particular rental item is needed, or not needed, at a particular distribution location generally depends upon whether customers associated with the particular distribution location need, or do not need, the rental item. The determination of whether customers need, or do not need, a particular rental item may be made based upon a wide variety of criteria that may vary depending upon the requirements of a particular application.

i. Time-Based Determinations

According to one embodiment of the invention, the determination of whether a particular rental item is needed, or not needed, at a particular distribution location is made based upon whether customers associated with the particular distribution location need, or do not need, the particular rental item by or within a specified time. For example, suppose that distribution locations DL1-DL6 are configured to distribute digital media containing movies to customers. In this situation, the specified time might be a particular time each day, e.g., 6 am. Thus, according to the "inventory free" approach described herein, digital media that are not needed by customers associated with distribution location DL1 by 6 am each day are sent to distribution location DL3.

Alternatively, a "low inventory" approach may specify that rental items that are not needed by customers within a specified time of being received at a distribution location are sent to the designated distribution location. Thus, for example, digital media that are not requested by customers within three days of being received at distribution location DL1 are sent to designated distribution location DL3. This approach limits the amount of time that inventory is maintained by distribution locations other than the designated distribution location.

ii. Actual and Predicted Customer Demand for Rental Items (including Rental Queues)

According to one embodiment of the invention, actual demand for rental items by customers associated with a particular distribution location is used to determine the types and numbers of rental items needed, and not needed, by the customers associated with the particular distribution location. For example, actual customer requests for rental items may be examined to determine the rental items currently requested by customers. This may include examining customer requests contained in customer request queues. The determined demand for rental items may be greater than the actual demand to provide a "cushion" or margin to accommodate an unexpected increase in demand.

The demand for rental items at a particular distribution location may also be predicted. For example, in the context of movies, the number of customer requests for a new release at a particular distribution location may be predicted based upon actual requests for prior new releases. Correlation analysis between new releases and prior new releases may also be used to predict the number of requests for new releases. The rental queues for customers associated with the particular distribution location may be examined to predict the future demand for rental items.

iii. Actual and Predicted Returns of Rental Items

According to another embodiment of the invention, actual returns of rental items from customers are used to determine the types and numbers of rental items needed, and not needed, at distribution locations. Rental items that are returned to a particular distribution location are available to other customers associated with the particular distribution location. Thus, the number of actual returns may be used to determine whether a particular distribution location has sufficient local inventory to satisfy current demand, or whether the particular distribution location has excess inventory that can be sent to the designated distribution location. Alternatively, the rental items may be sent to another distribution location and provided to customers associated with the other distribution location. The predicted return of rental items may also be used to determine whether rental items are needed at the particular distribution location. For example, an indication may be received that a rental item is being returned and should be received on a particular date. As another example, the return of a particular rental item may be predicted based upon past rental experiences for the particular rental item and for the particular customer currently renting the particular rental item.

iv. Net Ships

According to another embodiment of the invention, "net ships" is used to determine the types and numbers of rental items needed, and not needed, at distribution locations. "Net Ships" provides a general indication of whether demand exceeds available inventory and is defined as follows:

$$\text{Net Ships} = S + D - R$$

where:

S is the number of units actually shipped,

D is the unfulfilled demand, which is the number of additional units that would have been shipped, assuming unlimited inventory, and R is the number of units received Thus, the sum of S and D represents the total demand.

Consider the following example in the context of renting copies of a particular movie title on digital media, e.g., DVDs. Suppose that for a particular distribution location, $S=5$; $D=3$ and $R=6$. In this situation, the Net Ships is two, indicating that for the particular distribution location, the total demand for the particular movie title was eight units and exceeded available inventory and receipts by two units. Since the demand cannot be satisfied by inventory currently available at the particular distribution location, either the customers must wait until copies of the rental item are returned, or until additional copies of the particular movie title can be provided to the customers from another distribution location. In some situations, Net Ships may be a negative value, which generally indicates that the number of units received exceeded the total demand for the particular rental item. For example, suppose that for the particular distribution location, $S=5$; $D=0$ and $R=6$. In this situation, the unfulfilled demand is zero and there were more units returned than shipped, for a Net Ships of negative one. Thus, the total demand of five was capable of being satisfied from the six returned units.

An average Net Ships over time may also be determined depending upon the requirements of a particular application. For example, the average Net Ships per movie title may be determined over multiple days. Net Ships and average Net Ships may be used to manage inventory by identifying trends. This is particularly useful in situations where the demand for rental items changes over time. For example, there is often an immediate and large demand for new release movie titles, followed by a peak demand and then a decrease in demand over time until a relatively low "steady state" demand is reached. Actual Net Ship data may be used to predict future demand for rental items and to manage inventory accordingly.

The number of rental items needed for "float" at any particular time may be estimated using statistical methods. According to one embodiment, if the number of users who have indicated an interest in a particular title of rental item is known, and the average number of days each customer takes to return a previously rented rental item is known, the expected number of shipments can be calculated, and hence the variance of the shipment rate. Similarly, if the number of users who already have that particular title is known, and the average length of time for which they keep it is known, then the expected number of returns can be calculated, and the variance of the return rate. By subtracting expected returns from expected shipments, the expected net shipments is calculated. By summing the variances of each process, the total variance is calculated. The standard deviation of the expected net shipments is equal to the square root of the variance. Assuming that it is desired to maintain enough float to satisfy natural random fluctuations in shipment volume for a certain period of time, the float should be enough to cover the expected net ships for that period of time, plus some multiple of the standard deviations. For example, to have sufficient float to satisfy natural random fluctuations in shipment volume 95% of the time, 1.64 standard deviations of additional float are required over and above the expected net ship rate, as determined by looking in a standard statistical table of normal distributions, or by other computational or simulation means.

v. Actual and Predicted Loss and Breakage of Rental Items

According to another embodiment of the invention, actual loss or breakage of rental items from customers is used to determine the types and numbers of rental items needed, and not needed, at distribution locations. For example, in the context of renting movies or music on digital media, such as CDs, CD-ROMs, DVDs and the like, a certain percentage of the digital media will be lost or damaged during transit between distribution locations and customers and between distribution locations.

Breakage and loss of rental items may also be predicted based upon actual loss and damage experience and the prediction used to determine the rental items needed at distribution locations. For example, the actual loss or breakage of rental items for each distribution location may be measured over time and the measurements used to predict future loss or breakage of rental items from particular distribution locations.

D. Using Upper and Lower Bounds to Manage Rental Item Inventory

One of the issues in inventory management is how to maintain proper inventory levels in situations where the demand for rental items changes over time. Even when a proper inventory level can be accurately determined for a particular demand level at a particular time, demand levels can quickly change, making the proper inventory level difficult to determine over time.

According to one embodiment of the invention, upper and lower bounds are used to manage rental item inventory at distribution locations in environments where demand for rental items changes over time. An upper bound represents the greatest number of rental items that are expected to be needed at a distribution location to satisfy customer demand. The lower bound represents the least number of rental items that are expected to be needed at a distribution location to satisfy customer demand. When available rental item inventory at a distribution location exceeds the upper bound, then there is an excess of rental item inventory at the distribution location and rental items are sent from the distribution location to the designated distribution location. When available rental item inventory at a distribution location falls below the lower upper bound, then is insufficient rental item inventory at he distribution location and rental items are sent from the designated distribution location back to the distribution location. Thus, a lower bound defines a lower threshold of rental item inventory that is sufficient to satisfy customer demand, even when the customer demand varies over time. An upper bound defines an upper threshold of rental item inventory that limits the amount of excess inventory that is maintained by a distribution location.

The determination of whether rental inventory satisfies the upper and lower bounds may include consideration of actual current inventory as well as predicted returns of inventory. For example, the rental item inventory at a particular distribution location may currently be insufficient to satisfy the lower bound, but based upon predicted returns of rental items to the particular distribution location, the inventory will soon be sufficient to satisfy the lower bound. In this situation, additional rental item inventory may not be requested from the designated distribution location. According to one embodiment of the invention, net ships is used to evaluate whether upper and lower bounds are satisfied.

Upper and lower bounds may be determined based upon a variety of factors depending upon the requirements of a particular application and the invention is not limited to any particular factors. For example, upper and lower bounds may be calculated based upon past demand for rental items. Past demand may reflect average past demand over a specified time or peak demand. Upper and lower bounds may also be calculated based upon predicted demand for rental items or a combination of past demand and predicted demand for rental items.

Separate upper and lower bounds may be determined for each type of rental item at a distribution location since the number of rental items that is required to satisfy customer demand may vary for each type of rental item at the distribution location. For example, in the context of providing movies to customers on digital media such as DVDs, separate upper and lower bounds for each movie title may be determined for the distribution location. Also, separate upper and lower bounds for each movie title may be determined for each distribution location. Thus, the determined upper and lower bounds for a particular move title at a first distribution location may be different than the upper and lower bounds determined for the same particular movie title at a second distribution location.

According to one embodiment of the invention, upper and lower bounds may be dynamically adjusted over time based upon actual inventory requirement experience or changes in predicted inventory requirements. For example, suppose that in actual experience, a lower bound is not being satisfied, meaning that inventory levels are falling below the lower bound. To avoid not having enough inventory to satisfy customer demand, the lower bound may be adjusted higher. In this situation, additional inventory is requested sooner, in response to either increased demand or decreased returns, than if the lower bound was lower. As another example, in actual experience, an upper bound may not be satisfied, meaning that inventory levels have exceeded the upper bound. To avoid having too much inventory, the upper bound may be adjusted lower. In this situation, inventory is sent to the designated location sooner, in response to either decreased demand or increased returns, than if the upper bound was higher.

8. Implementation Mechanisms

The approach described herein for renting items to customers is applicable to any type of rental application and (without limitation) is particularly well suited for Internet-based rental applications for renting movies and music to customers. The invention may be implemented in hardware circuitry, in computer software, or a combination of hardware circuitry and computer software and is not limited to a particular hardware or software implementation.

Figure 10:
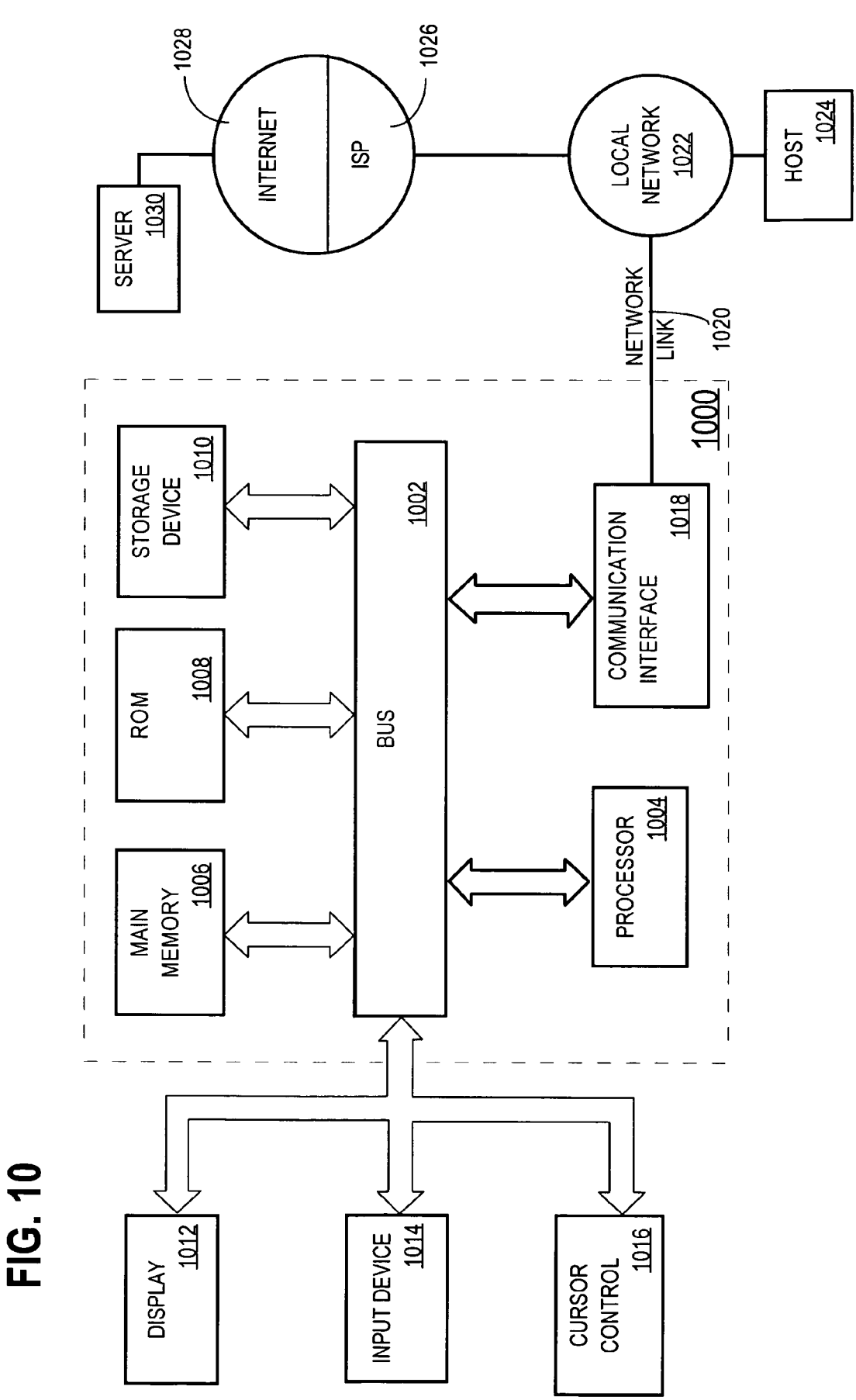
FIG. 10 is a block diagram of a computer system upon which embodiments of the invention may be implemented.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another machine-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1000, various machine-readable media are involved, for example, in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing digital versatile discs (DVDs) carrying movies in distribution locations, the method comprising the machine-implemented steps of:

identifying a first set of one or more DVDs located at a first distribution location, wherein the first set of one or more DVDs carry a first set of movies that has not been requested for rent by rental customers associated with the first distribution location;

causing the first set of one or more DVDs to be sent from the first distribution location to a designated distribution location;

identifying a second set of one or more DVDs located at a second distribution location, wherein the second set of DVDs carry a second set of movies that has not been requested for rent by rental customers associated with the second distribution location; and causing the second set of one or more DVDs to be sent from the second distribution location to the designated distribution location, wherein the first, second and designated distribution locations are distinct distribution locations.

2. A method as recited in claim 1, wherein:
the step of causing the first set of one or more DVDs to be sent from the first distribution location to a designated distribution location includes causing the first set of one or more DVDs to be sent from the first distribution location to a designated distribution location by mail, and
the step of causing the second set of one or more DVDs to be sent from the second distribution location to the designated distribution location includes causing the second set of one or more DVDs to be sent from the second distribution location to the designated distribution location by mail.

3. A method as recited in claim 1, wherein:
DVDs rented by the customers associated with the first distribution location are sent to the customers associated with the first distribution location via mail, and
DVDs rented by the customers associated with the second distribution location are sent to the customers associated with the second distribution location via mail.

4. A method for managing rental items in distribution locations, the method comprising the machine-implemented steps of:
a computer identifying a first set of one or more rental items at a first distribution location that is not needed by customers associated with the first distribution location;
the computer causing the first set of one or more rental items to be sent from the first distribution location to a designated distribution location;
the computer identifying a second set of one or more rental items at a second distribution location that is not needed by customers associated with the second distribution location; and
the computer causing the second set of one or more rental items to be sent from the second distribution location to the designated distribution location, wherein the first, second and designated distribution locations are distinct distribution locations.

5. A method as recited in claim 4, wherein the step of identifying the first set of one or more rental items at the first distribution location that are not needed at the first distribution location is made based upon actual customer demand for rental items by customers associated with the first distribution location.

6. A method as recited in claim 4, wherein the step of identifying the first set of one or more rental items at the first distribution location that are not needed at the first distribution location is made based upon predicted demand for rental items by customers associated with the first distribution location.

7. A method as recited in claim 6, wherein the predicted requests for rental items by customers associated with the first distribution location are determined by examining one or more rental queues for the customers associated with the first distribution location, wherein the one or more rental queues indicate one or more rental items that the customers associated with the first distribution location desire to rent.

8. A method as recited in claim 4, wherein the step of identifying the first set of one or more rental items at the first distribution location that are not needed at the first distribution location is made based upon actual returns of rental items by customers associated with the first distribution location.

9. A method as recited in claim 4, wherein the step of identifying the first set of one or more rental items at the first distribution location that are not needed at the first distribution location is made based upon a comparison of rental items sent from the first distribution location to customers associated with the first distribution location, unfulfilled demand for rental items at the first distribution location and rental items returned to the first distribution location.

10. A method as recited in claim 4, wherein the step of identifying the first set of one or more rental items at the first distribution location that are not needed at the first distribution location is made based upon predicted returns of rental items by customers associated with the first distribution location.

11. A method as recited in claim 4, wherein the step of identifying the first set of one or more rental items at the first distribution location that are not needed at the first distribution location is made based upon actual loss or breakage of rental items.

12. A method as recited in claim 4, further comprising the machine-implemented step of determining the a first set of one or more rental items that are not be needed by customers associated with the first distribution location based upon a prediction.

13. A method as recited in claim 4, wherein:
the step of identifying a first set of one or more rental items at the first distribution location that are not be needed by customers associated with the first distribution location includes identifying a first set of one or more rental items that are not be needed by customers associated with the first distribution location within a specified time.

14. A method as recited in claim 4, wherein:
the step of identifying a first set of one or more rental items at the first distribution location that are not be needed by customers associated with the first distribution location includes identifying a first set of one or more rental items that are not be needed by customers associated with the first distribution location by a specified time.

15. A method as recited in claim 4, further comprising the machine-implemented step of in response to determining that a particular rental item from the first set of one or more rental items provided from the designated distribution location to the first distribution location is needed at the first distribution location, then providing the particular rental item from the designated distribution location to the first distribution location.

16. A method as recited in claim 4, further comprising the machine-implemented step of in response to determining that a particular rental item from the first set of one or more rental items provided from the designated distribution location to the first distribution location is needed at the second distribution location, then providing the particular rental item from the designated distribution location to the second distribution location.

17. A method as recited in claim 4, further comprising the step of selecting the designated distribution location from a plurality of distribution locations based upon selection criteria that include the geographical proximity of the designated distribution location with respect to the first and second distribution locations.

18. A method as recited in claim 4, further comprising the step of selecting the designated distribution location from a plurality of distribution locations based upon selection criteria that include a storage capacity of the designated distribution location.

19. A method as recited in claim 4, wherein:
the first set of rental items is a first set of digital media, and
the second set of rental items is a second set of digital media.

20. A method as recited in claim 4, wherein:
the first set of rental items is a first set of digital media containing movies, and the second set of rental items is a second set of digital media containing movies.

21. A method as recited in claim 4, wherein:
the first set of rental items is a first set of digital media containing games, and
the second set of rental items is a second set of digital media containing games.

22. A method as recited in claim 4, wherein:
the first set of rental items is a first set of digital media containing music, and
the second set of rental items is a second set of digital media containing music.

23. A method as recited in claim 4, wherein:
the first set of rental items is a first set of digital media containing computer software, and
the second set of rental items is a second set of digital media containing computer software.

24. A method as recited in claim 4, wherein:
the first set of rental items is a first set of DVDs containing movies, and
the second set of rental items is a second set of DVDs containing movies.

25. A method as recited in claim 4, wherein:
the step of causing the first set of one or more rental items to be sent from the first distribution location to a designated distribution location includes causing the first set of one or more rental items to be sent from the first distribution location to a designated distribution location by mail, and
the step of causing the second set of one or more rental items to be sent from the second distribution location to the designated distribution location includes causing the second set of one or more rental items to be sent from the second distribution location to the designated distribution location by mail.

26. A method as recited in claim 4, wherein:
rental items rented by the customers associated with the first distribution location are sent to the customers associated with the first distribution location via mail, and
rental items rented by the customers associated with the second distribution location are sent to the customers associated with the second distribution location via mail.

27. A method as recited in claim 4, wherein the step of identifying a first set of one or more rental items at a first distribution location that is not needed by customers associated with the first distribution location is made based upon an upper bound that indicates a maximum number of rental items to be maintained at the first distribution location.

28. A method as recited in claim 4, further comprising the step of changing the upper bound over time based upon a change in demand or a change in rental items returned from the customers associated with the first distribution location.

29. A method as recited in claim 4, further comprising the step of in response to determining that a number of rental items at the first distribution location is less than a lower bound, then causing one or more additional items to be provided to the first distribution location from the designated distribution location.

30. A machine-readable medium for managing digital versatile discs (DVDs), the machine-readable medium carrying one or more instructions which, when executed by one or more processors, cause the one or more processors to perform the steps of:
a computer identifying a first set of one or more DVDs located at a first distribution location, wherein the first set of one or more DVDs carry a first set of movies that has not been requested for rent by rental customers associated with the first distribution location;
the computer causing the first set of one or more DVDs to be sent from the first distribution location to a designated distribution location;
the computer identifying a second set of one or more DVDs located at a second distribution location, wherein the second set of DVDs carry a second set of movies that has not been requested for rent by rental customers associated with the second distribution location; and
the computer causing the second set of one or more DVDs to be sent from the second distribution location to the designated distribution location, wherein the fist, second and designated distribution locations are distinct distribution locations.

31. A machine-readable medium as recited in claim 30, wherein:
the step of causing the first set of one or more DVDs to be sent from the first distribution location to a designated distribution location includes causing the first set of one or more DVDs to be sent from the first distribution location to a designated distribution location by mail, and
the step of causing the second set of one or more DVDs to be sent from the second distribution location to the designated distribution location includes causing the second set of one or more DVDs to be sent from the second distribution location to the designated distribution location by mail.

32. A machine-readable medium as recited in claim 30, wherein:
DVDs rented by the customers associated with the first distribution location are sent to the customers associated with the first distribution location via mail, and
DVDs rented by the customers associated with the second distribution location are sent to the customers associated with the second distribution location via mail.

33. A machine-readable medium for managing rental items in distribution locations, the machine-readable medium carrying one or more instructions which, when executed by one or more processors, cause the one or more processors to perform the steps of:
identifying a first set of one or more rental items at a first distribution location that is not needed by customers associated with the first distribution location;
causing the first set of one or more rental items to be sent from the first distribution location to a designated distribution location;
identifying a second set of one or more rental items at a second distribution location that is not needed by customers associated with the second distribution location; and
causing the second set of one or more rental items to be sent from the second distribution location to the designated distribution location, wherein the first, second and designated distribution locations are distinct distribution locations.

34. A machine-readable medium as recited in claim 33, wherein the step of identifying the first set of one or more rental items at the first distribution location that are not needed at the first distribution location is made based upon actual customer demand for rental items by customers associated with the first distribution location.

35. A machine-readable medium as recited in claim 33, wherein the step of identifying the first set of one or more rental items at the first distribution location that are not needed at the first distribution location is made based upon predicted demand for rental items by customers associated with the first distribution location.

36. A machine-readable medium as recited in claim 35, wherein the predicted requests for rental items by customers associated with the first distribution location are determined by examining one or more rental queues for the customers associated with the first distribution location, wherein the one or more rental queues indicate one or more rental items that the customers associated with the first distribution location desire to rent.

37. A machine-readable medium as recited in claim 33, wherein the step of identifying the first set of one or more rental items at the first distribution location that are not needed at the first distribution location is made based upon actual returns of rental items by customers associated with the first distribution location.

38. A machine-readable medium as recited in claim 33, wherein the step of identifying the first set of one or more rental items at the first distribution location that are not needed at the first distribution location is made based upon a comparison of rental items sent from the first distribution location to customers associated with the first distribution location, unfulfilled demand for rental items at the first distribution location and rental items returned to the first distribution location.

39. A machine-readable medium as recited in claim 33, wherein the step of identifying the first set of one or more rental items at the first distribution location that are not needed at the first distribution location is made based upon predicted returns of rental items by customers associated with the first distribution location.

40. A machine-readable medium as recited in claim 33, wherein the step of identifying the first set of one or more rental items at the first distribution location that are not needed at the first distribution location is made based upon actual loss or breakage of rental items.

41. A machine-readable medium as recited in claim 33, further comprising one or more additional instructions which, when executed by the one or more processors, cause the one or more processors to perform the additional step of step of determining the a first set of one or more rental items that are not be needed by customers associated with the first distribution location based upon a prediction.

42. A machine-readable medium as recited in claim 33, wherein:
the step of identifying a first set of one or more rental items at the first distribution location that are not be needed by customers associated with the first distribution location includes identifying a first set of one or more rental items that are not be needed by customers associated with the first distribution location within a specified time.

43. A machine-readable medium as recited in claim 33, wherein:
the step of identifying a first set of one or more rental items at the first distribution location that are not be needed by customers associated with the first distribution location includes identifying a first set of one or more rental items that are not be needed by customers associated with the first distribution location by a specified time.

44. A machine-readable medium as recited in claim 33, further comprising one or more additional instructions which, when executed by the one or more processors, cause the one or more processors to perform the additional step of in response to determining that a particular rental item from the first set of one or more rental items provided from the designated distribution location to the first distribution location is needed at the first distribution location, then providing the particular rental item from the designated distribution location to the first distribution location.

45. A machine-readable medium as recited in claim 33, further comprising one or more additional instructions which, when executed by the one or more processors, cause the one or more processors to perform the additional step of in response to determining that a particular rental item from the first set of one or more rental items provided from the designated distribution location to the first distribution location is needed at the second distribution location, then providing the particular rental item from the designated distribution location to the second distribution location.

46. A machine-readable medium as recited in claim 33, further comprising one or more additional instructions which, when executed by the one or more processors, cause the one or more processors to perform the additional step of selecting the designated distribution location from a plurality of distribution locations based upon selection criteria that include the geographical proximity of the designated distribution location with respect to the first and second distribution locations.

47. A machine-readable medium as recited in claim 33, further comprising one or more additional instructions which, when executed by the one or more processors, cause the one or more processors to perform the additional step of selecting the designated distribution location from a plurality of distribution locations based upon selection criteria that include a storage capacity of the designated distribution location.

48. A machine-readable medium as recited in claim 33, wherein:
the first set of rental items is a first set of digital media, and
the second set of rental items is a second set of digital media.

49. A machine-readable medium as recited in claim 33, wherein:
the first set of rental items is a first set of digital media containing movies, and
the second set of rental items is a second set of digital media containing movies.

50. A machine-readable medium as recited in claim 33, wherein:
the first set of rental items is a first set of digital media containing games, and
the second set of rental items is a second set of digital media containing games.

51. A machine-readable medium as recited in claim 33, wherein:
the first set of rental items is a first set of digital media containing music, and
the second set of rental items is a second set of digital media containing music.

52. A machine-readable medium as recited in claim 33, wherein:
the first set of rental items is a first set of digital media containing computer software, and
the second set of rental items is a second set of digital media containing computer software.

53. A machine-readable medium as recited in claim 33, wherein:
the first set of rental items is a first set of DVDs containing movies, and
the second set of rental items is a second set of DVDs containing movies.

54. A machine-readable medium as recited in claim 33, wherein:
the step of causing the first set of one or more rental items to be sent from the first distribution location to a designated distribution location includes causing the first set of one or more rental items to be sent from the first distribution location to a designated distribution location by mail, and the step of causing the second set of one or more rental items to be sent from the second distribution location to the designated distribution location includes causing the second set of one or more rental items to be sent from the second distribution location to the designated distribution location by mail.

55. A machine-readable medium as recited in claim 33, wherein:
rental items rented by the customers associated with the first distribution location are sent to the customers associated with the first distribution location via mail, and
rental items rented by the customers associated with the second distribution location are sent to the customers associated with the second distribution location via mail.

56. A machine-readable medium as recited in claim 33, wherein the step of identifying a first set of one or more rental items at a first distribution location that is not needed by customers associated with the first distribution location is made based upon an upper bound that indicates a maximum number of rental items to be maintained at the first distribution location.

57. A machine-readable medium as recited in claim 33, further comprising one or more additional instructions which, when executed by the one or more processors, cause the one or more processors to perform the additional step of changing the upper bound over time based upon a change in demand or a change in rental items returned from the customers associated with the first distribution location.

58. A machine-readable medium as recited in claim 33, further comprising one or more additional instructions which, when executed by the one or more processors, cause the one or more processors to perform the additional step of in response to determining that a number of rental items at the first distribution location is less than a lower bound, then causing one or more additional items to be provided to the first distribution location from the designated distribution location.

59. An apparatus for managing digital versatile discs (DVDs), the apparatus comprising a memory carrying one or more instructions which, when executed by one or more processors, cause the one or more processors to perform the steps of:
identifying a first set of one or more DVDs located at a first distribution location, wherein the first set of one or more DVDs carry a first set of movies that has not been requested for rent by rental customers associated with the first distribution location;
causing the first set of one or more DVDs to be sent from the first distribution location to a designated distribution location;
identifying a second set of one or more DVDs located at a second distribution location, wherein the second set of DVDs carry a second set of movies that has not been requested for rent by rental customers associated with the second distribution location; and
causing the second set of one or more DVDs to be sent from the second distribution location to the designated distribution location, wherein the fist, second and designated distribution locations are distinct distribution locations.

60. An apparatus as recited in claim 59, wherein:
the step of causing the first set of one or more DVDs to be sent from the first distribution location to a designated distribution location includes causing the first set of one or more DVDs to be sent from the first distribution location to a designated distribution location by mail, and the step of causing the second set of one or more DVDs to be sent from the second distribution location to the designated distribution location includes causing the second set of one or more DVDs to be sent from the second distribution location to the designated distribution location by mail.

61. An apparatus as recited in claim 59, wherein:
DVDs rented by the customers associated with the first distribution location are sent to the customers associated with the first distribution location via mail, and
DVDs rented by the customers associated with the second distribution location are sent to the customers associated with the second distribution location via mail.

62. An apparatus for managing rental items in distribution locations, the apparatus comprising a memory carrying one or more instructions which, when executed by one or more processors, cause the one or more processors to perform the steps of:
identifying a first set of one or more rental items at a first distribution location that is not needed by customers associated with the first distribution location;
causing the first set of one or more rental items to be sent from the first distribution location to a designated distribution location;
identifying a second set of one or more rental items at a second distribution location that is not needed by customers associated with the second distribution location; and
causing the second set of one or more rental items to be sent from the second distribution location to the designated distribution location, wherein the first, second and designated distribution locations are distinct distribution locations.

63. An apparatus as recited in claim 62, wherein the step of identifying the first set of one or more rental items at the first distribution location that are not needed at the first distribution location is made based upon actual customer demand for rental items by customers associated with the first distribution location.

64. An apparatus as recited in claim 62, wherein the step of identifying the first set of one or more rental items at the first distribution location that are not needed at the first distribution location is made based upon predicted demand for rental items by customers associated with the first distribution location.

65. An apparatus as recited in claim 64, wherein the predicted requests for rental items by customers associated with the first distribution location are determined by examining one or more rental queues for the customers associated with the first distribution location, wherein the one or more rental queues indicate one or more rental items that the customers associated with the first distribution location desire to rent.

66. An apparatus as recited in claim 62, wherein the step of identifying the first set of one or more rental items at the first distribution location that are not needed at the first distribution location is made based upon actual returns of rental items by customers associated with the first distribution location.

67. An apparatus as recited in claim 62, wherein the step of identifying the first set of one or more rental items at the first distribution location that are not needed at the first distribution location is made based upon a comparison of rental items sent from the first distribution location to customers associated with the first distribution location, unfulfilled demand for rental items at the first distribution location and rental items returned to the first distribution location.

68. An apparatus as recited in claim 62, wherein the step of identifying the first set of one or more rental items at the first distribution location that are not needed at the first distribution location is made based upon predicted returns of rental items by customers associated with the first distribution location.

69. An apparatus as recited in claim 62, wherein the step of identifying the first set of one or more rental items at the first distribution location that are not needed at the first distribution location is made based upon actual loss or breakage of rental items.

70. An apparatus as recited in claim 62, wherein the memory further comprises one or more additional instructions which, when executed by the one or more processors, cause the one or more processors to perform the additional step of step of determining the a first set of one or more rental items that are not be needed by customers associated with the first distribution location based upon a prediction.

71. An apparatus as recited in claim 62, wherein:
the step of identifying a first set of one or more rental items at the first distribution location that are not be needed by customers associated with the first distribution location includes identifying a first set of one or more rental items that are not be needed by customers associated with the first distribution location within a specified time.

72. An apparatus as recited in claim 62, wherein:
the step of identifying a first set of one or more rental items at the first distribution location that are not be needed by customers associated with the first distribution location includes identifying a first set of one or more rental items that are not be needed by customers associated with the first distribution location by a specified time.

73. An apparatus as recited in claim 62, wherein the memory further comprises one or more additional instructions which, when executed by the one or more processors, cause the one or more processors to perform the additional step of in response to determining that a particular rental item from the first set of one or more rental items provided from the designated distribution location to the first distribution location is needed at the first distribution location, then providing the particular rental item from the designated distribution location to the first distribution location.

74. An apparatus as recited in claim 62, wherein the memory further comprises one or more additional instructions which, when executed by the one or more processors, cause the one or more processors to perform the additional step of in response to determining that a particular rental item from the first set of one or more rental items provided from the designated distribution location to the first distribution location is needed at the second distribution location, then providing the particular rental item from the designated distribution location to the second distribution location.

75. An apparatus as recited in claim 62, wherein the memory further comprises one or more additional instructions which, when executed by the one or more processors, cause the one or more processors to perform the additional step of selecting the designated distribution location from a plurality of distribution locations based upon selection criteria that include the geographical proximity of the designated distribution location with respect to the first and second distribution locations.

76. An apparatus as recited in claim 62, wherein the memory further comprises one or more additional instructions which, when executed by the one or more processors, cause the one or more processors to perform the additional step of selecting the designated distribution location from a plurality of distribution locations based upon selection criteria that include a storage capacity of the designated distribution location.

77. An apparatus as recited in claim 62, wherein:
the first set of rental items is a first set of digital media, and
the second set of rental items is a second set of digital media.

78. An apparatus as recited in claim 62, wherein:
the first set of rental items is a first set of digital media containing movies, and
the second set of rental items is a second set of digital media containing movies.

79. An apparatus as recited in claim 62, wherein:
the first set of rental items is a first set of digital media containing games, and
the second set of rental items is a second set of digital media containing games.

80. An apparatus as recited in claim 62, wherein:
the first set of rental items is a first set of digital media containing music, and
the second set of rental items is a second set of digital media containing music.

81. An apparatus as recited in claim 62, wherein:
the first set of rental items is a first set of digital media containing computer software, and
the second set of rental items is a second set of digital media containing computer software.

82. An apparatus as recited in claim 62, wherein:
the first set of rental items is a first set of DVDs containing movies, and
the second set of rental items is a second set of DVDs containing movies.

83. An apparatus as recited in claim 62, wherein:
the step of causing the first set of one or more rental items to be sent from the first distribution location to a designated distribution location includes causing the first set of one or more rental items to be sent from the first distribution location to a designated distribution location by mail, and
the step of causing the second set of one or more rental items to be sent from the second distribution location to the designated distribution location includes causing the second set of one or more rental items to be sent from the second distribution location to the designated distribution location by mail.

84. An apparatus as recited in claim 62, wherein:
rental items rented by the customers associated with the first distribution location are sent to the customers associated with the first distribution location via mail, and
rental items rented by the customers associated with the second distribution location are sent to the customers associated with the second distribution location via mail.

85. An apparatus as recited in claim 62, wherein the step of identifying a first set of one or more rental items at a first distribution location that is not needed by customers associated with the first distribution location is made based upon an upper bound that indicates a maximum number of rental items to be maintained at the first distribution location.

86. An apparatus as recited in claim 62, wherein the memory further comprises one or more additional instructions which, when executed by the one or more processors, cause the one or more processors to perform the additional step of changing the upper bound over time based upon a change in demand or a change in rental items returned from the customers associated with the first distribution location.

87. An apparatus as recited in claim 62, wherein the memory further comprises one or more additional instructions which, when executed by the one or more processors, cause the one or more processors to perform the additional step of in response to determining that a number of rental items at the first distribution location is less than a lower bound, then causing one or more additional items to be provided to the first distribution location from the designated distribution location.

* * * * *

UNITED STATES PATENT AND TRADEMARK OFFICE
CERTIFICATE OF CORRECTION

| | | |
|---|---|---|
| PATENT NO. | : 7,546,252 B2 | Page 1 of 2 |
| APPLICATION NO. | : 10/746605 | |
| DATED | : June 9, 2009 | |
| INVENTOR(S) | : W. Reed Hastings et al. | |

It is certified that error appears in the above-identified patent and that said Letters Patent is hereby corrected as shown below:

Page 3, item (56) Other Publications, please add:
The International Searching Authority, "Notification of Transmittal of the International Search Report or The Declaration", International application No. PCT/US2004/043119, mailed September 27, 2007, 7 pages.

Col. 21, Line 41: delete "are", and insert --is--.
Col. 21, Line 47: delete "are", and insert --is--.
Col. 21, Line 60: delete "are", and insert --is--.
Col. 21, Line 65: delete "are", and insert --is--.
Col. 22, Line 6: delete "are", and insert --is--.
Col. 22, Line 16: delete "a".
Col. 22, Line 17: delete "are not be needed", and insert --is not needed--.
Col. 22, Line 22: delete "are not be needed", and insert --is not needed--.
Col. 22, Line 25: delete "are not be needed", and insert --is not needed--.
Col. 22, Line 29: delete "are not be needed", and insert --is not needed--.
Col. 22, Line 32: delete "are not be needed", and insert --is not needed--.
Col. 24, Line 13: delete "fist", and insert --first--.
Col. 25, Line 13: delete "are", and insert --is--.
Col. 25, Line 19: delete "are", and insert --is--.
Col. 25, Line 28: delete "are", and insert --is--.
Col. 25, Line 34: delete "are", and insert --is--.
Col. 25, Line 40: delete "step of step of", and insert --step of--.
Col. 25, Line 41: delete "a".
Col. 25, Line 41: delete "that are", and insert --that is--.
Col. 25, Line 42: delete "not be needed", and insert --not needed--.
Col. 25, Line 47: delete "are not be needed", and insert --is not needed--.
Col. 25, Line 50: delete "are not be needed", and insert --is not needed--.
Col. 25, Line 55: delete "are not be needed", and insert --is not needed--.
Col. 25, Line 58: delete "are not be needed", and insert --is not needed--.
Col. 27, Line 62: delete "fist", and insert --first--.
Col. 28, Line 39: delete "are", and insert --is--.
Col. 28, Line 45: delete "are", and insert --is--.
Col. 28, Line 58: delete "are", and insert --is--.
Col. 28, Line 63: delete "are", and insert --is--.

UNITED STATES PATENT AND TRADEMARK OFFICE
CERTIFICATE OF CORRECTION

PATENT NO. : 7,546,252 B2
APPLICATION NO. : 10/746605
DATED : June 9, 2009
INVENTOR(S) : W. Reed Hastings et al.

It is certified that error appears in the above-identified patent and that said Letters Patent is hereby corrected as shown below:

Col. 29, Line 5: delete "are", and insert --is--.
Col. 29, Line 11: delete "are", and insert --is--.
Col. 29, Line 18: delete "step of step of", and insert --step of--.
Col. 29, Line 18: delete "a".
Col. 29, Line 19: delete "are not be needed", and insert --is not needed--.
Col. 29, Line 23: delete "are not be needed", and insert --is not needed--.
Col. 29, Line 30: delete "are not be needed", and insert --is not needed--.
Col. 29, Line 33: delete "are not be needed", and insert --is not needed--.

Signed and Sealed this

Eighteenth Day of August, 2009

David J. Kappos
*Director of the United States Patent and Trademark Office*